United States Patent
Tucker et al.

(10) Patent No.: US 12,385,151 B2
(45) Date of Patent: Aug. 12, 2025

(54) METHODS TO IMPROVE THE DURABILITY OF METAL-SUPPORTED SOLID OXIDE ELECTROCHEMICAL DEVICES

(71) Applicant: The Regents of the University of California, Oakland, CA (US)

(72) Inventors: Michael Tucker, Piedmont, CA (US); Emir Dogdibegovic, Oakland, CA (US); Ruofan Wang, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 830 days.

(21) Appl. No.: 17/609,353

(22) PCT Filed: May 6, 2020

(86) PCT No.: PCT/US2020/031713
§ 371 (c)(1),
(2) Date: Nov. 5, 2021

(87) PCT Pub. No.: WO2020/231708
PCT Pub. Date: Nov. 19, 2020

(65) Prior Publication Data
US 2022/0145480 A1 May 12, 2022

Related U.S. Application Data

(60) Provisional application No. 62/846,246, filed on May 10, 2019.

(51) Int. Cl.
*C25B 11/04* (2021.01)
*H01M 4/88* (2006.01)
(Continued)

(52) U.S. Cl.
CPC ............ *C25B 11/04* (2013.01); *H01M 4/8803* (2013.01); *H01M 4/9033* (2013.01); *H01M 8/12* (2013.01)

(58) Field of Classification Search
CPC .. C25B 11/04; C25B 1/04; C25B 9/23; C25B 9/73; H01M 4/8803; H01M 4/9033; H01M 8/12; Y02E 60/50; Y02E 60/36
(Continued)

(56) References Cited

U.S. PATENT DOCUMENTS 6,605,316 B1  8/2003  Visco et al.
6,682,842 B1  1/2004  Visco et al.
(Continued)

FOREIGN PATENT DOCUMENTS

WO  WO-2019189918 A1 * 10/2019 ............. C22C 38/18

OTHER PUBLICATIONS

R. Wang et al. Metal-Supported Solid Oxide Electrolysis Cell with Significantly Enhanced Catalysis, Energy Technology, Apr. 17, 2019 (Year: 2019).*
(Continued)

*Primary Examiner* — Danielle M. Carda
(74) *Attorney, Agent, or Firm* — Lowenstein Sandler LLP

(57) ABSTRACT

This disclosure provides systems, methods, and apparatus related to metal-supported solid oxide electrochemical devices. In one aspect, a stainless steel support of a device is oxidized. A coating is deposited on an oxygen-electrode side of the stainless steel support of the device. The coating is operable to reduce chromium evaporation from the stainless steel support. A structure including an oxygen catalyst on the oxygen-electrode side of the device and a fuel catalyst on a fuel-electrode side of the stainless steel support of the device, with an electrolyte disposed between the oxygen catalyst and the fuel catalyst, is formed. The device is
(Continued)

thermally treated at a temperature of about 10° C. to 400° C. above an operating temperature of about 600° C. to 800° C. of the device, the oxygen-electrode side of the device being in an oxidizing atmosphere and the fuel-electrode side of the device being in a reducing atmosphere.

20 Claims, 13 Drawing Sheets

(51) Int. Cl.
*H01M 4/90* (2006.01)
*H01M 8/12* (2016.01)
(58) Field of Classification Search
USPC .......................................................... 148/276
See application file for complete search history.

(56) References Cited

U.S. PATENT DOCUMENTS

| | | | |
|---|---|---|---|
| 6,740,441 B2 | 5/2004 | Jacobson et al. | |
| 6,767,662 B2 | 7/2004 | Jacobson et al. | |
| 6,846,511 B2 | 1/2005 | Visco et al. | |
| 6,887,361 B1 | 5/2005 | Visco et al. | |
| 6,979,511 B2 | 12/2005 | Visco et al. | |
| 7,118,777 B2 | 10/2006 | Visco et al. | |
| 7,232,626 B2 | 6/2007 | Jacobson et al. | |
| 7,351,488 B2 | 4/2008 | Visco et al. | |
| 7,553,573 B2 | 6/2009 | Visco et al. | |
| 7,740,966 B2 | 6/2010 | Jacobson et al. | |
| 7,829,213 B2 | 11/2010 | Jacobson et al. | |
| 8,283,077 B1 | 10/2012 | Visco et al. | |
| 8,287,673 B2 | 10/2012 | Tucker et al. | |
| 8,343,686 B2 | 1/2013 | DeJonghe et al. | |
| 8,445,159 B2 | 5/2013 | Tucker et al. | |
| 8,586,580 B2 | 11/2013 | Sim et al. | |
| 2007/0269701 A1* | 11/2007 | Larsen | H01M 8/126 429/496 |
| 2010/0143824 A1 | 6/2010 | Tucker et al. | |
| 2011/0053041 A1 | 3/2011 | Tucker et al. | |
| 2013/0040220 A1* | 2/2013 | Kim | C22C 38/24 429/468 |
| 2013/0108943 A1 | 5/2013 | Yamanis et al. | |
| 2017/0222248 A1 | 8/2017 | Kawakami | |
| 2021/0408568 A1* | 12/2021 | Echigo | H01M 8/0247 |

OTHER PUBLICATIONS

Ansar, A. et al., "Metal Supported Solid Oxide Fuel Cells and Stacks for Auxilary Power Units—Progress, Challenges and Lessons Learned"; The Electrochemical Society Transactions, 2011, pp. 147-155, vol. 35, No. 1.

Choi, H.J, et al., "Surface Tuning of Solid Oxide Fuel Cell Cathode by Atomic Layer Deposition"; Advanced Energy Materials, Oct. 15, 2018, 9 pages, vol. 8, No. 33.

Christiansen, N. et al., "Solid Oxide Fuel Cell Development at Topsoe Fuel Cell A/S and Risoe National Laboratory"; Conference Proceedings Energy Solutions for Sustainable Development, May 15, 2007, pp. 357-362, Roskilde, Denmark.

Dogdibegovic, E. et al.; "High performance metal-supported solid oxide fuel cells with infiltrated electrodes"; Journal of Power Sources, Nov. 10, 2018, pp. 91-98; vol. 410-411; with Corrigendum to the article printed May 15, 2021 in Journal of Power Sources, vol. 494.

Fergus, J.W. "Effect of cathode and electrolyte transport properties on chromium poisoning in solid oxide fuel cells"; International Journal of Hydrogen Energy, Nov. 2007, pp. 3664-3671, vol. 32 ,issue 16.

Gong, Y., et al., "Stabilizing Nanostructured Solid Oxide Fuel Cell Cathode with Atomic Layer Deposition"; Nano Letters, Aug. 7, 2013, pp. 4340-4345, American Chemical Society, vol. 13, No. 9.

Jiang, S.P. et al., "Chromium deposition and poisoning of cathodes of solid oxide fuel cells"; International Journal of Hydrogen Energy, Jan. 2, 2014, pp. 505-531, vol. 39, Issue 1.

Karimaghaloo, A., et al., "Mechanism of Cathodic Performance Enhancement by a Few-Nanometer-Thick Oxide Overcoat on Porous Pt Cathodes of Solid Oxide Fuel Cells"; ACS Omega, Mar. 7, 2017, pp. 806-813, vol. 2.

Konysheva, E. et al., "Chromium Poisoning of Perovskite Cathodes by the ODS Alloy Cr5Fe1Y2O3 and the High Chromium Ferritic Steel Crofer22APU" Journal of The Electrochemical Society, Feb. 24, 2006, pp. A76-A773, vol. 153.

Lau, G.Y. et al.; "Chromium transport by solid state diffusion on solid oxide fuel cell cathode"; Journal of Power Sources, Nov. 15, 2010, pp. 7540-7547, vol. 195, iss. 22.

Leah, R.T. et al.; "Ceres Power Steel Cell Technology: Rapid Progress Towards a Truly Commercially Viable SOFC"; The Electrochemical Society Transactions, 2015, pp. 95-107, vol. 68, No. 1.

Matsuzaki, Y. et al., "Electrochemical properties of a SOFC cathode in contact with a chromium-containing alloy separator"; Solid State Ionics, Jul. 2000, pp. 271-278, vol. 132, issues 3-4.

Matsuzaki, Y. et al.; "Dependence of SOFC Cathode Degradation by Chromium-Containing Alloy on Compositions of Electrodes and Electrolytes"; Journal of the Electrochemical Society, 2001, pp. A126-A131, vol. 148, No. 2.

Minh, N. Minh, et al., "Advances in Solid Oxide Fuel Cells: Review of Progress through Three Decades of he International Symposia on Solid Oxide Fuel Cells"; The Electrochemical Society Transactions, 2017, pp. 63-73, vol. 78, No. 1.

Shaigan, N. et al., "A review of recent progress in coatings, surface modifications and alloy developments for solid oxide fuel cell ferritic stainless steel interconnects"; Journal of Power Sources, Mar. 15, 2010, pp. 1529-1542; vol. 195, issue 6.

Tucker, M.C., et al., "A fundamental study of chromium deposition on solid oxide fuel cell cathode materials"; Journal of Power Sources, Sep. 29, 2006, pp. 130-138; vol. 160, issue 1.

Tucker, M.C., et al.; "Playing with Fire: Commercialization of a Metal-Supported SOFC Product for Use in Charcoal Cookstoves for the Developing World"; The Electrochemical Society Transactions, 2017, pp. 503-509, vol. 78, No. 1.

Tucker, M.C.; "Durability of symetric-structured metal-supported solid oxide fuel cells"; Journal of Power Sources, Nov. 30, 2017, pp. 6-12, vol. 369.

Wang, R.F. et al, "Chromium Poisoning Effects on Performance of (La,Sr)MnO3-Based Cathode in Anode-Supported Solid Oxide Fuel Cells"; Journal of The Electrochemical Society, 2017, pp. F740-F747; vol. 164.

International Search Report and Written Opinion for International Application No. PCT/US20/31713 mailed Sep. 11, 2020, 14 pages.

Tucker, M.C., "Progress in metal-supported solid oxide fuel cells: A review," Journal of Power Sources, available online Feb. 20, 2010, pp. 4570-4582; vol. 195.

Tucker, M.C., "Development of High Power Density Metal-Supported Solid Oxide Fuel Cells," Energy Technology, 2017, pp. 2175-2181; vol. 5, 201700242.

Dogdibegovic, E., et al., "Progress in durability of metal-supported solid oxide fuel cells with infiltrated electrodes," Journal of Power Sources, available online Jul. 29, 2019; pp. 11 pages, vol. 494.

Wang, R., et al., "Metal-Supported Solid Oxide Electrolysis Cell with Significantly Enhanced Catalysis," Energy Technology, 2019, 13 pages, vol. 7, 1801154.

* cited by examiner

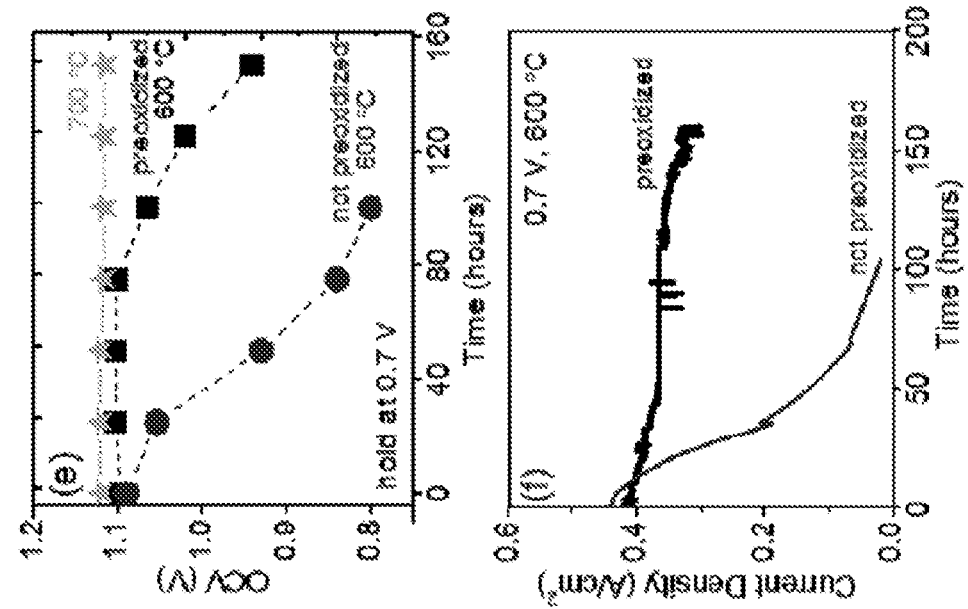
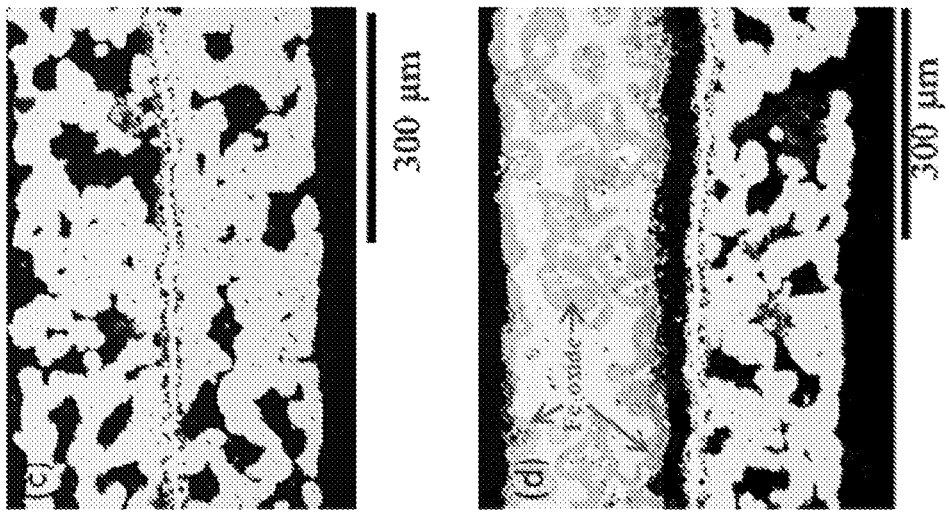
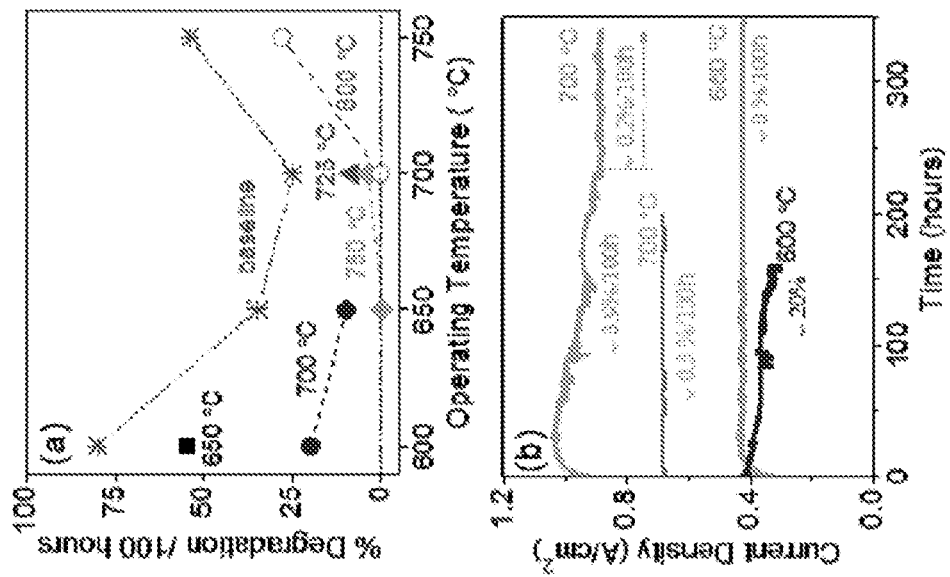

METHODS TO IMPROVE THE DURABILITY OF METAL-SUPPORTED SOLID OXIDE ELECTROCHEMICAL DEVICES

RELATED APPLICATIONS

This application claims priority to U.S. Provisional Patent Application No. 62/846,246, filed May 10, 2019, which is herein incorporated by reference. This application is related to U.S. patent application Ser. No. 15/968,917, filed May 2, 2018, which is herein incorporated by reference.

STATEMENT OF GOVERNMENT SUPPORT

This invention was made with government support under Contract No. DE-AC02-05CH11231 awarded by the U.S. Department of Energy, under Award No. DE-EE0008079 awarded by the U.S. Department of Energy, Office of Energy Efficiency and Renewable Energy, Fuel Cell Technologies Office, and under Grants No. 13/CJ000/04/03 and 18/CJ000/04/01 awarded by the Department of Energy ARPA-E program.

TECHNICAL FIELD

This disclosure relates generally to metal-supported solid oxide electrochemical devices and more particularly to methods of improving the durability of metal-supported solid oxide electrochemical devices.

BACKGROUND

The symmetric-architecture metal supported solid oxide fuel cells (MS-SOFCs) developed at Lawrence Berkeley National Laboratory (LBNL), with thin ceramic backbones and electrolyte layer sandwiched between low-cost stainless steel supports, provide a number of advantages over all-ceramic SOFCs. These advantages include mechanical ruggedness, excellent tolerance to thermal and redox cycling (critical in cases of disruption, intermittent fuel supply, or thermal fluctuations following load changes), and extremely fast start-up capability. Furthermore, the majority of the cell is an inexpensive FeCr-based ferritic stainless steel and only a single co-sintering step is required, which can significantly reduce the materials and fabrication cost.

In our recent reports [M. C. Tucker, Journal of Power Sources, 195 (2010) 4570-4582; M. C. Tucker, G. Y. Lau, C. P. Jacobson, L. C. DeJonghe, S. J. Visco, Journal of Power Sources, 175 (2008) 447-451; M. C. Tucker, Energy Technology, 5 (2017) 2175-2181; all of which are herein incorporated by reference], the challenges of co-processing of the metal support and zirconia backbone structure in a single reducing-environment sintering step were addressed. Matched thermal expansion and sintering shrinkage, good bonding and chemical compatibility between the cell components, and low oxidation rate suitable for the long lifetimes in stationary and mobile SOFC power plants have been demonstrated. It is desirable to operate MS-SOFCs in the temperature range of 650–700° C., where a suitable tradeoff between performance and longevity is achieved. Higher operating temperature may lead to: (1) rapid oxidation of the metal support ($\geq$800° C.), (2) accelerated Cr poisoning of the cathode catalyst, and (3) rapid catalyst coarsening. Lower operating temperature constrains the power density. Due to these challenges, progress in MS-SOFC peak power density has been rather stagnated, remaining typically between 50 and 500 mW $cm^{-2}$ in the temperature range of 650° C. to 850° C. Small passenger vehicles, however, require high power due to limited volume to house the MS-SOFC stack, and immediate response during rapid vehicular acceleration and transient driving conditions, such as intermittent fuel flow and continuous load variation.

BRIEF DESCRIPTION OF THE DRAWINGS

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

FIGS. 2A-2C shown cathode (PrOx) catalyst coarsening via thermal annealing at 700° C. and continuous electrochemical operation at 0.7 V for 100 hours. FIGS. 2D-2F shows anode ($SDCN_{40}$) catalyst coarsening via thermal annealing at 700° C. and continuous electrochemical operation at 0.7 V for 100 hours. FIG. 2G shows powder X-ray diffraction on $PrO_x$ cathode catalyst calcined at 600° C. and after thermal annealing at 700° C. in air for 100 h hours. FIG. 2H shows X-ray diffraction patterns for of $SDCN_{40}$ anode catalyst upon reduction at 700° C. for 1 hour, and after 100 hours of thermal annealing at 700° C. in 3% humidified hydrogen.

FIG. 4A-4F show the impact of pre-coarsening and pre-oxidation treatment. FIG. 4A shows the degradation rate at various operating temperatures for cells pre-coarsened at the temperatures indicated in the figure. FIG. 4B shows continuous operation at various temperatures with catalyst pre-coarsening at various temperatures. Cross sectional SEM images of symmetric cell architecture (top is air-side) after 100 hours and 0.7 V operation at 700° C. (FIG. 4C) and 600° C. (FIG. 4D). FIG. 4E shows OCV stability at 700° C. and 600° C. FIG. 4F shows continuous operation at 600° C. with and without preoxidation of the metal support.

FIG. 6A shows the normalized initial performance and FIG. 6B shows degradation rate for as-sintered and pre-oxidized cells with various coatings. FIG. 6C shows EDS results from cells operated at 0.7 V and 700° C. for 200 hours with ALD coatings on as-sintered or preoxidized air-side metal support. Pre-coarsened cell without coatings is used as a baseline. FIG. 6D shows continuous operation of pre-coarsened cells with no additional treatment, ALD-$CoO_x$ coating, and preoxidation followed by ALD-$CoO_x$ coating. FIG. 6E shows bars that represent quantified power retention (percentage of remaining power density after 100 hours of operation vs. beginning of life) observed for the post-sintering fabrication processes, individually and combined. Each process is associated with different shading and marking. Experimental results from full cells are overlaid.

FIG. 7A shows peak power density and power retention with various cell improvements. FIG. 7B shows long-term durability for baseline and improved cells at 700° C. and 0.7 V. FIG. 7C shows corresponding EIS spectra at OCV and 700° C. for baseline cell [$0^{th}$ hour (line), $100^{th}$ hour (squares)] and improved cell [0th hour (line) and 200th hour (triangles), the two data sets overlap]. Cross-section SEM images of fresh $PrO_x$ (FIG. 7D), after in situ pre-coarsening (FIG. 7E), and after 200 hours at 0.7 V and 700° C. (FIG. 7F).

DETAILED DESCRIPTION

Figure 1A:
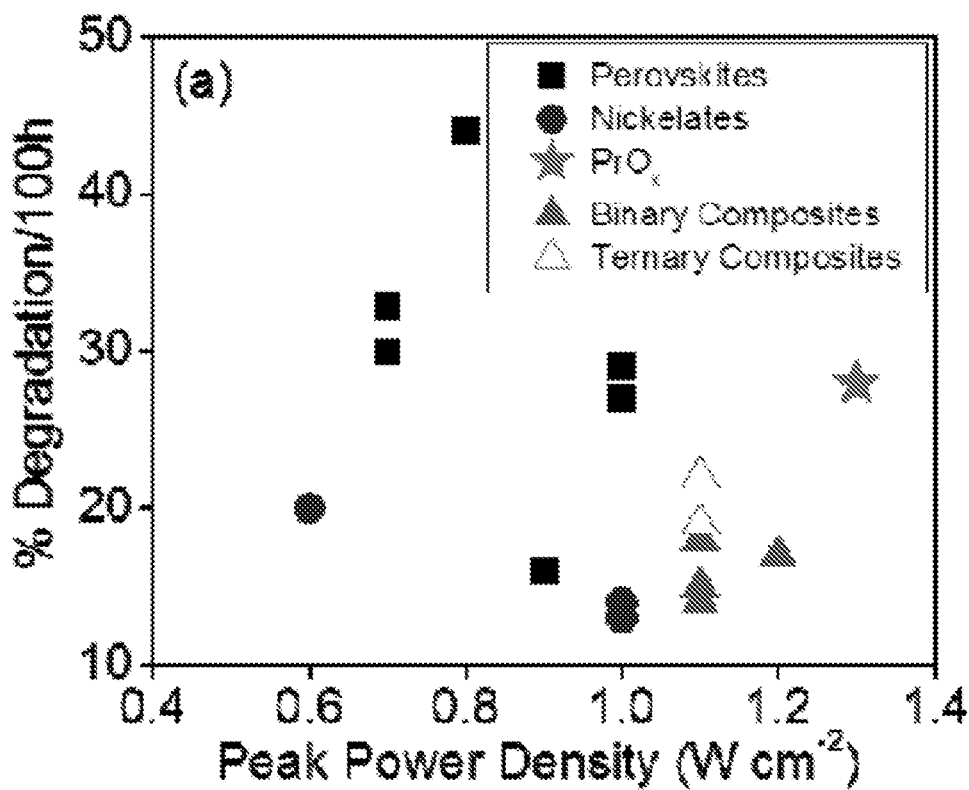
FIG. 1A shows degradation and fuel cell performance with various cathode catalysts.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

In our preceding report (E. Dogdibegovic, R. F. Wang, G. Y. Lau, M. C. Tucker, Journal of Power Sources, 410 (2019) 91-98, herein incorporated by reference), the cell specification (catalyst precursor chemistry, thickness of each cell layer, cell sintering conditions, backbone porosity, and catalyst firing temperature) was determined, and YSZ electrolyte was replaced with higher-conductivity and thinner 10Sc1CeSZ (SCSZ). Infiltrating catalysts after cosintering the metal support and zirconia layers ensured high performance. With $Pr_6O_{11}$ cathode catalyst and SDC 60 vol %-Ni 40 vol % ($SDCN_{40}$) anode catalyst, power density of 1.56 W $cm^{-2}$ at 700° C. in 3% humidified hydrogen was achieved.

Following substantial progress in improving performance, in this work we focus on increasing the longevity of MS-SOFCs. The expected lifetime of MS-SOFC stacks in vehicles is ~10,000 hours; hence, fabrication of high performing and durable cells is crucial for commercialization of this technology. Premature degradation of anode-supported, all-ceramic SOFCs with steel stack components has been studied in great detail in the past few decades. Attempts to suppress Cr transport and cathode Cr poisoning were implemented through a variety of conductive/protective coatings of interconnectors, surface treatments and modifications (for example, Co—Mn spinels), and alloy developments. Different compositions of electrodes and electrolytes were found to undergo varying degree of degradation due to chromium poisoning.

In this work, the performance vs. durability tradeoff was studied across a range of operation temperatures and catalyst compositions in high-performance MS-SOFCs. The major degradation mechanisms were isolated and addressed individually. Significant improvement in MS-SOFC durability was achieved by implementing preoxidation of the metal support, atomic layer deposition (ALD) protective coatings, and in situ catalyst pre-coarsening. Combining these additional steps into the MS-SOFC fabrication process leads to two orders of magnitude decrease in degradation rate while preserving high performance.

Figure 8:
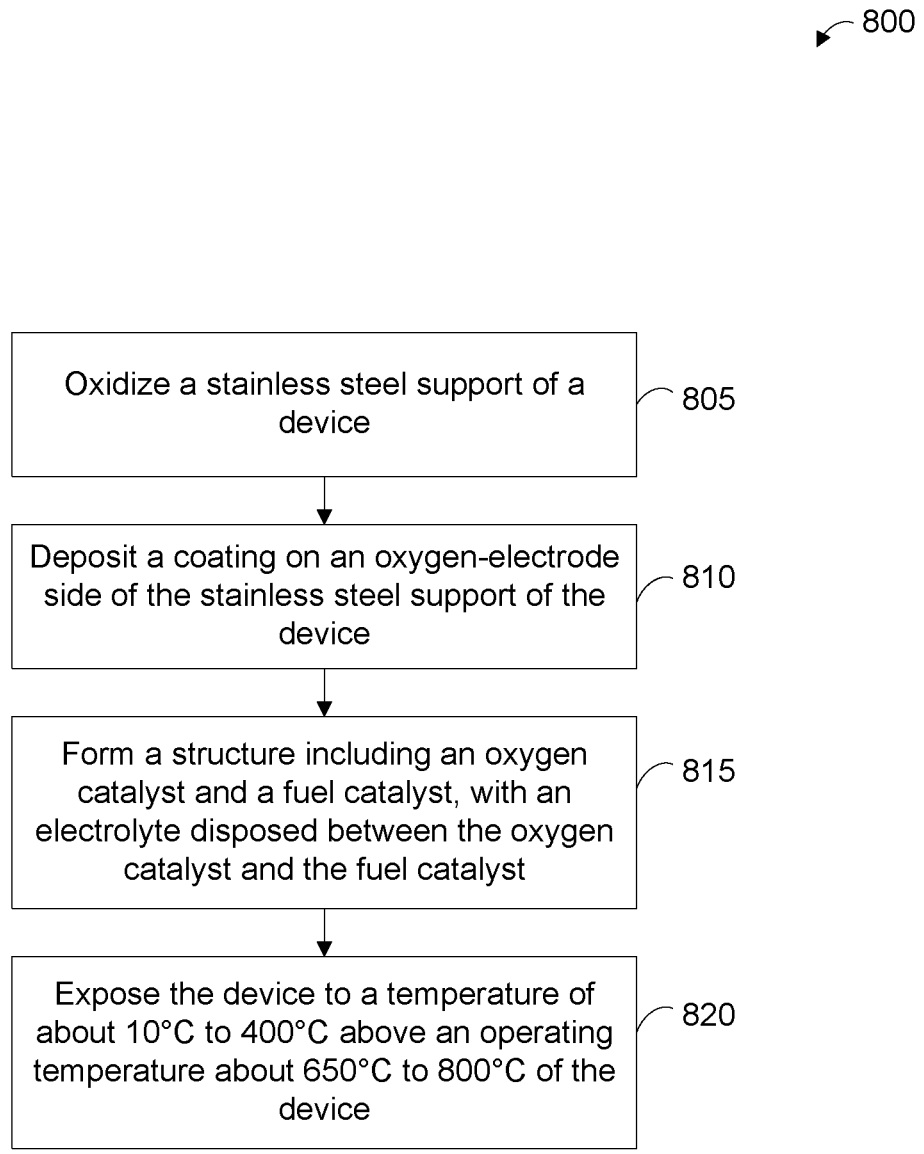
FIG. 8 shows an example of a flow diagram illustrating a fabrication process for a metal-supported solid oxide electrochemical device.

FIG. 8 shows an example of a flow diagram illustrating a fabrication process for a metal-supported solid oxide electrochemical device. Starting at block 805 of the method 800 shown in FIG. 8, a stainless steel support of a metal-supported solid oxide electrochemical device is oxidized. In some embodiments, the stainless steel support is oxidized at about 700° C. to 1000° C., or about 850° C., for about 0.1 hours to 14 hours, or about 10 hours, in air or or in a mixture of gases comprising steam and hydrogen. In some embodiments, the stainless steel support is oxidized at about 900° C. for about 0.5 hours to 2 hours, or about 950° C. for about 5 minutes to 1 hour, in air or in a mixture of gasses comprising steam and hydrogen. In some embodiments, this oxidizing operation produces a layer of chromium oxide ($Cr_2O_3$) on the stainless steel support.

The chromium oxide can reduce the oxidation rate of the stainless steel in later processing operations in the fabrication of the device. Also, the chromium oxide can reduce the oxidation rate of the stainless steel when the device is operation. Further, the chromium oxide can help to prevent iron from the stainless steel from reacting with other materials during the fabrication of the device. Yet, further, in some embodiments, the chromium oxide provides a clean and continuous surface onto which a coating is deposited at block 810.

In some embodiments, the device is selected from a group consisting of a metal supported solid oxide fuel cell (MS-SOFC), a metal supported solid oxide electrolysis cell, a metal supported solid oxide electrochemical reactor, a metal supported solid oxide oxygen generator, a metal supported solid oxide electrochemical hydrogen generator, and a metal supported solid oxide electrochemical hydrogen compressor.

At block 810, a coating is deposited on an oxygen-electrode side of the stainless steel support of the device. The coating is operable to reduce chromium evaporation from the stainless steel support. In some embodiments, the coating is deposited using a method selected from a group consisting of atomic layer deposition, electrophoretic deposition, and infiltrating the coating on the stainless steel support. In some embodiments, the coating is a conformal coating. A conformal coating is a coating that conforms to the contours of the stainless steel support. In some embodiments, the coating is selected from a group consisting of cobalt, manganese, copper, aluminum, yttrium, cerium, lanthanum, nickel, iron, chromium, alloys of the foregoing elements, and oxides of the foregoing elements and alloys. In some embodiments, the coating reduces the oxidation rate of the stainless steel in the fabrication process and when the device is in operation.

At block 815, a structure including an oxygen catalyst on the oxygen-electrode side of the device, a fuel catalyst on a fuel-electrode side of the stainless steel support of the device, and an electrolyte disposed between the oxygen catalyst and the fuel catalyst is formed. In some embodiments, block 815 includes forming the oxygen catalyst on the oxygen-electrode side of the device and a fuel catalyst on a fuel-electrode side of the stainless steel support of the device, as the electrolyte may be formed prior to blocks 805 and 810. This structure can be fabricated with different methods. For example, catalyst infiltration techniques, as described in the Example, can be used to fabricate the structure.

In some embodiments, the oxygen catalyst comprises Pr-oxide ($PrO_x$), a composite of Pr-oxide ($PrO_x$) and samarium doped ceria (SDC), or a composite of lanthanum strontium cobalt ferrite (LSCF) and samarium doped ceria (SDC).

Depending on how the device is operated (e.g., as a fuel cell or an electrolysis cell), the oxygen catalyst and the fuel catalyst can operate in different manners. For example, when the device is operated as a fuel cell, oxygen reduction occurs at the oxygen catalyst and hydrogen oxidation occurs at the fuel catalyst. For example, when the device is operated as an electrolysis cell, oxygen evolution occurs and the oxygen catalyst and hydrogen evolution occurs at the fuel catalyst.

At block 820, the device is thermally treated at a temperature of about 10° C. to 400° C. above an operating temperature of about 600° C. to 800° C., or about 700° C., of the device. When the device is thermally treated, the oxygen-electrode side of the device is in an oxidizing atmosphere and a fuel-electrode side of the device is in a reducing atmosphere. In some embodiments, the temperature is about 25° C. to 100° C. above the operating temperature of the device, or the temperature is about 750° C.

In some embodiments, the thermal treatments sinters and/or coarsens the oxygen catalyst and the fuel catalyst. In some embodiments, when sintering the oxygen catalyst and the fuel catalyst, the thermal treatment is for about 0.5 hours to 10 hours. In some embodiments, after sintering the oxygen catalyst and the fuel catalyst, the thermal treatment coarsens the microstructure of the oxygen catalyst and the fuel catalyst. In some embodiments, coarsening the microstructure of the oxygen catalyst and the fuel catalyst grows a grain size or particle size of the oxygen catalyst and a grain size or particles size of the fuel catalyst to about 50 nanometers (nm) to 1 micron. In some embodiments, when sintering and coarsening the oxygen catalyst and the fuel catalyst, the thermal treatment is for about 0.5 hours to 10 hours.

In some embodiments, after block 820, the oxygen catalyst is again deposited on the oxygen-electrode side of the device and/or the fuel catalyst is deposited on a fuel-electrode side of the device. In some embodiments, the device is then thermally treated again, similar to block 820. In some embodiments, the device is not thermally treated again. Not thermally treating the device again can maintain the surface area of the oxygen catalyst and the fuel catalyst.

In some embodiments, the operations at blocks 805, 810, and 820 can be performed independently or in any combination to improve the durability of the device. For example, in some embodiments, a method of fabricating a device includes blocks 815 and 820. As another example, in some embodiments, a method of fabricating a device includes blocks 810, 815, and 820.

Figure 9:
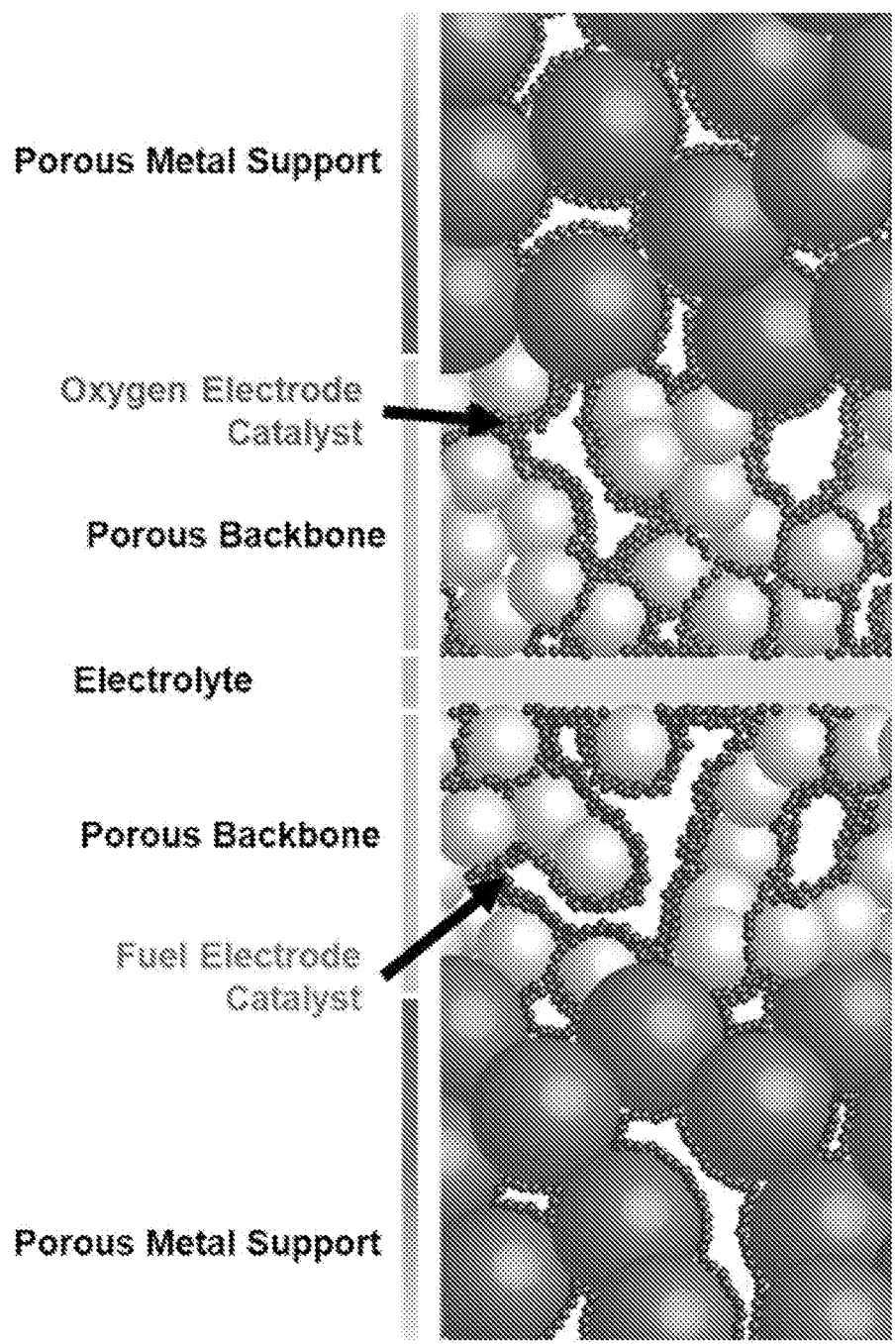
FIG. 9 shows an example of a schematic illustration of a metal-supported solid oxide electrochemical device that can be fabricated using the process of FIG. 8.

FIG. 9 shows an example of a schematic illustration of a metal-supported solid oxide electrochemical device 900 that can be fabricated using the process of FIG. 8.

The following examples are intended to be examples of the embodiments disclosed herein, and are not intended to be limiting.

Example 1

Green cells were assembled by laminating individual 10Sc1CeSZ electrode backbone and electrolyte, and stainless steel (P434L alloy, water atomized) support layers prepared by tape-casting with aqueous tape-casting binder. The electrode and support layers were prepared with polymethyl methacrylate poreformer beads. The resulting symmetric-structure MS-SOFCs were laser-cut from the laminated tape-cast layers and the edges were cleaned with an air duster to remove any loose particles. Cells were then debinded in a box furnace by firing in air at 525° C. for 1 h with 0.5° C. mini heating rate to slowly remove the binder and pore former. The cells were then sintered at 1350° C. for 2 h in a tubular furnace while flowing 2% hydrogen/argon. The resulting cells were 30 mm in diameter which had 250 μm thick porous metal supports, 25 μm thick porous cathode and anode backbones, and 12 μm thick 10Sc1CeSZ electrolyte. More details about specification of each cell layer can be found in our previous work.

Precursor mixtures of metal nitrates were prepared with the intended final stoichiometric composition. A surfactant with loading of 0.3 g per 2 g of resulting catalyst was added to metal nitrates and dissolved in 20 to 100 wt % (vs. catalyst) of water. More detailed description can be found in a previous report. The areas of MS-SOFCs that were not intended to be infiltrated were covered with acrylic paint mask providing 1 $cm^2$ active area. The cells were then fired at 3° C. mini heating rate to 600° C. or 850° C. for 30 min in air to convert the precursors to the intended oxide phases. The cells were re-infiltrated a number of times: (1) cathodes were infiltrated a total of three times, with firing at 850° C., 600° C., and 600° C. (2) while anodes were infiltrated three to four times, with firing at 850° C., 600° C., 600° C., and 600° C. In the case of composite cathodes, up to five infiltrations were implemented. For instance, a ternary composite cathode has three different layers, an electronic conductor that provides good electronic conduction at the triple phase boundary (TPB) and was infiltrated first and sintered at 850° C., an ionic conductor that provides good ionic conduction and was infiltrated second and sintered at either 600° C. or 850° C., and the bulk catalyst for the oxygen reduction reaction (ORR) which was infiltrated three times and sintered at 600° C. XRD measurements on catalyst powders were obtained using a powder diffractometer.

Five categories of cathode catalysts were screened in full cells, including: (1) perovskites: $La_{0.85}Sr_{0.15}MnO_{3-\delta}$ (LSM), $La_{0.8}Sr_{0.2}FeO_{3-\delta}$ (LSF), $LaNi_{0.6}Fe_{0.4}O_{3-\delta}$ (LNF), $(La_{0.60}Sr_{0.40})_{0.95}CO_{0.20}Fe_{0.80}O_{3-\delta}$ (LSCF), $La_{0.6}Sr_{0.4}CoO_{3-\delta}$ (LSC), $Sm_{0.5}Sr_{0.5}CoO_{3-\delta}$ (SSC); (2) nickelates: $Pr_2NiO_{4+\delta}$ (PNO), $La_2NiO_{4+\delta}$ (LNO), $Nd_2NiO_{4+\delta}$ (NNO); (3) praseodymium oxide ($PrO_x$); (4) binary composites: $La_{0.85}Sr_{0.15}MnO_{3-\delta}$—$Sm_{0.20}Ce_{0.80}O_{2-\delta}$ (LSM-SDC), $Pr_6O_{11}$—$Sm_{0.20}Ce_{0.80}O_{2-\delta}$ ($PrO_x$-SDC), $Sm_{0.5}Sr_{0.5}CoO_{3-\delta}$—$Sm_{0.20}Ce_{0.80}O_{2-\delta}$ (SSC-SDC); and (5) ternary composites: $La_{0.85}Sr_{0.15}MnO_{3-\delta}$—$Sm_{0.20}Ce_{0.80}O_{2-\delta}$—$Pr_6O_{11}$ (LSM-SDC-$PrO_x$), and $SM_{0.5}Sr_{0.5}CoO_{3-\delta}$—$Sm_{0.20}Ce_{0.80}O_{2-\delta}$—$Pr_6O_{11}$ (SSC-SDC-$PrO_x$). Anode catalysts included different Ni concentration mixed with $Sm_{0.20}Ce_{0.80}O_{2-\delta}$ (SDC). The Ni fraction varied from 10-50 vol %.

Some MS-SOFCs were preoxidized in air at 850° C. for 10 h. ALD coating was implemented on either cathode or anode side of MS-SOFCs. The cells were placed on a Si wafer and the edges of cells were covered with Kapton tape (for $CoO_x$ and $Al_2O_3$) or Al foil (for $CeO_2$ and $Y_2O_3$) ensuring only the top side of cells got coated. Cathode side was coated with $CoO_x$, $Y_2O_3$, or $Al_2O_3$, while anode was coated with $CeO_2$. Bis(cyclopentadienyl)cobalt(II), tris(m-ethylcyclopentadienyl)yttrium(III), tris(dimethylamido)aluminum(III), tris(i-propylcyclo-pentadienyl)cerium(III) were used as the organometallic precursors for $CoO_x$, $Y_2O_3$, $Al_2O_3$, and $CeO_2$ respectively, and deionized water was used as the oxygen source. Both $CoO_x$ and $Al_2O_3$ were coated between 40-80° C. (chamber and stage temperature) with average of 0.6 Å/cycle until a desired coating thickness was achieved. The chamber temperature for $CeO_2$ and $Y_2O_3$ was 250° C. with expected growth rate of ~1.0 Å/cycle; 15 and 20 cycles were performed for $CeO_2$ and $Y_2O_3$, respectively. The coatings were too thin to study via SEM, but the calibration for each coating recipe was conducted on a Si wafer and the thickness was measured via ellipsometry. The catalyst infiltration and calcination immediately followed.

Complete cells were mounted on 410 stainless steel rigs using glass paste. Each side of the cell was spot-welded with a small Pt mesh on two NiCr wires, for good electrical contact. The applied glass paste was heated to 200° C. at 2° C. mini and then heated to 700° C. at 10° C. mini and held for one hour. The anode chamber was then flushed with nitrogen followed by hydrogen humidified at room temperature. The cathode side was exposed to static air. The i-V and electrochemical impedance spectroscopy (EIS) measurements were recorded with a multichannel potentiostat and current booster.

Catalyst performance and durability screening was performed on YSZ-based MS-SOFCs with 12 μm YSZ electrolyte thickness (Table 1). The cathode compositions tested in cathode/YSZ/$SDCN_{20}$ MS-SOFC cell configuration include five families: (1) perovskite cathodes, (2) nickelate cathodes, (3) praseodymium oxide, (4) binary layered composites, and (5) ternary layer composites. The initial OCV was 1.12±0.03 V (theoretical value is 1.12 in 3% humidified hydrogen), and remained within 2% of the initial value after 100 hours of operation at 700° C. and 0.7 V. The overall peak power density and degradation at 700° C. are grouped by cathode family in Table 1.

Perovskites showed the lowest overall peak power density and highest degradation, followed by nickelates which exhibit lower degradation. $Pr_6O_{11}$ ($PrO_x$) stood out as having the highest peak power density (1.3 W $cm^{-2}$) but showed similar degradation to perovskites. Although the intrinsic transport properties of nano-scale ceramics remain to be investigated, the high peak power density in cells with $PrO_x$ cathode was attributed to enhanced oxygen ion transport properties. The peak power density and degradation for different cathode catalysts are summarized in Table 1 and FIG. 1A. The binary composite cathodes exhibited the highest overall peak power density and the lowest degradation rates (FIG. 1A). Due to severity of degradation for each cathode composition, $PrO_x$ was chosen solely due to its higher initial performance.

TABLE 1

MS-SOFC performance and stability at 0.7 V with various cathode and anode catalyst compositions at 700° C.

| Abbreviation | OCV (V) | Peak Power (W/cm²) | % Degradation/ 100 hours |
|---|---|---|---|
| Perovskites | | | |
| LSM | 1.12 | 0.9 | 16 |
| SSC | 1.10 | 1.0 | 27 |
| LSC | 1.09 | 1.0 | 29 |
| LSF | 1.09 | 0.7 | 30 |
| LNF | 1.11 | 0.7 | 33 |
| LSCF | 1.10 | 0.8 | 44 |
| Nickelates | | | |
| NNO | 1.11 | 1.0 | 13 |
| LNO | 1.10 | 1.0 | 14 |
| PNO | 1.09 | 0.6 | 20 |
| $Pr_6O_{11}$ | | | |
| $Pr_6O_{11}$ | 1.12 | 1.3 | 28 |
| Binary Composites | | | |
| LSM-SDC$_{600}$* | 1.09 | 1.1 | 14 |
| LSM-SDC$_{850}$** | 1.12 | 1.1 | 15 |
| $PrO_x$-SDC | 1.10 | 1.2 | 17 |
| SSC-SDC | 1.11 | 1.1 | 18 |
| Ternary Composites | | | |
| LSM-SDC-$PrO_x$ | 1.12 | 1.1 | 19 |
| SSC-SDC-$PrO_x$ | 1.09 | 1.1 | 22 |
| Anodes | | | |
| 10% Ni-SDC | 1.11 | 1.28 | 44 |
| 20% Ni-SDC | 1.10 | 1.30 | 43 |
| 30% Ni-SDC | 1.12 | 1.32 | 40 |
| 40% Ni-SDC | 1.12 | 1.34 | 43 |
| 50% Ni-SDC | 1.11 | 1.35 | 40 |

*SDC calcined at 600° C.;
**SDC calcined at 850° C.

Figure 1B:
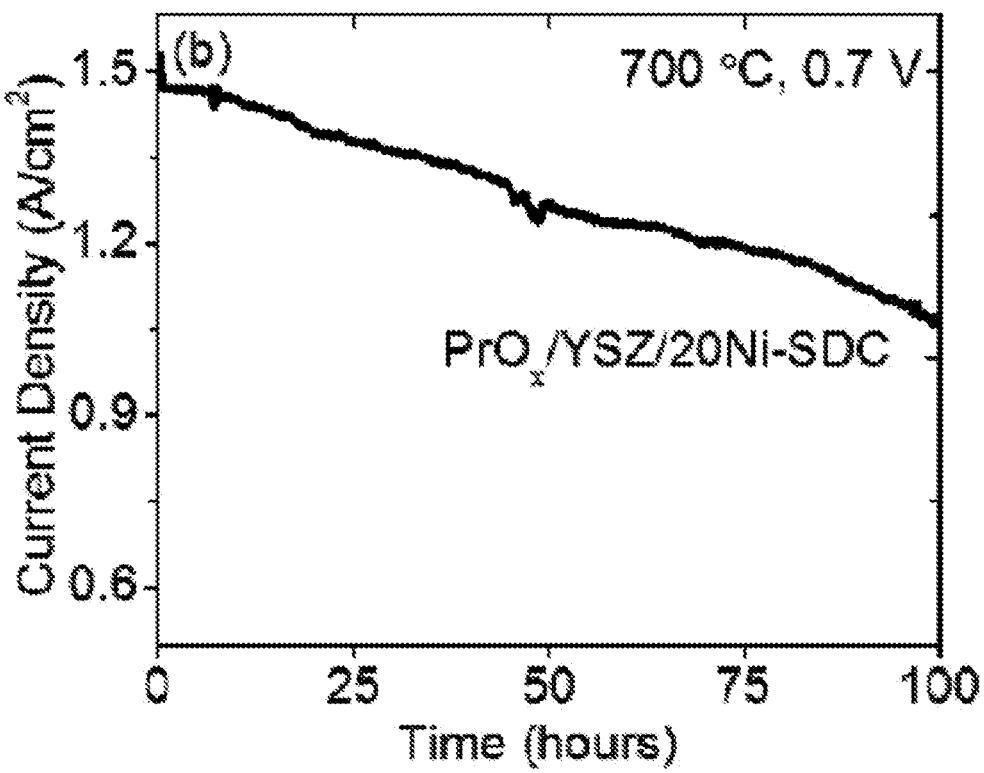
FIG. 1B shows baseline MS-SOFCs degradation at 700° C. and 0.7 V for selected $PrO_x$ cathode catalyst.

Performance degraded substantially during the initial 100 hours of operation for all families of cathodes. For instance, the cell with $PrO_x$ cathode and $SDCN_{20}$ (20 vol % 80 vol % SDC) anode degraded ~30%/100 h (FIG. 1B). A separate batch of $PrO_x$/YSZ/SDCN MS-SOFCs was used to isolate the anode contribution to performance degradation by varying the Ni:SDC ratio of the infiltrated catalyst from 10 to 50 vol %. Peak power increased moderately with Ni concentration, while the degradation rates remained similar (Table 1). This suggests that degradation is dominated by the cathode catalysts. In our preceding work, $SDCN_{40}$ (40 vol % Ni-SDC) was selected for high performing cells based on the balance between $R_{ohm}$ and $R_{pol}$ values, while Ni ratio above 40 vol % in the anode lead to marginal increase in power but rapid degradation. $SDCN_{40}$ remains the anode of choice for further durability studies in this work.

It is well known that SOFC nanocatalysts tend to coarsen at elevated temperatures and/or during electrochemical operation, which leads to decline in active surface area of the catalyst and consequently performance degradation. Microstructural changes (e.g. coarsening) occur to minimize the local surface energy through particle rearrangement and evolution of grain boundaries. Our previous long-term durability tests on LSM/YSZ/SDCN$_{20}$ cells revealed rapid performance degradation (70%/1,000 hours) which was linked to catalyst coarsening and chromium poisoning of the LSM catalyst. Such magnitude of degradation does not meet the requirements for vehicular applications.

Figures 2A, 2B, 2C:
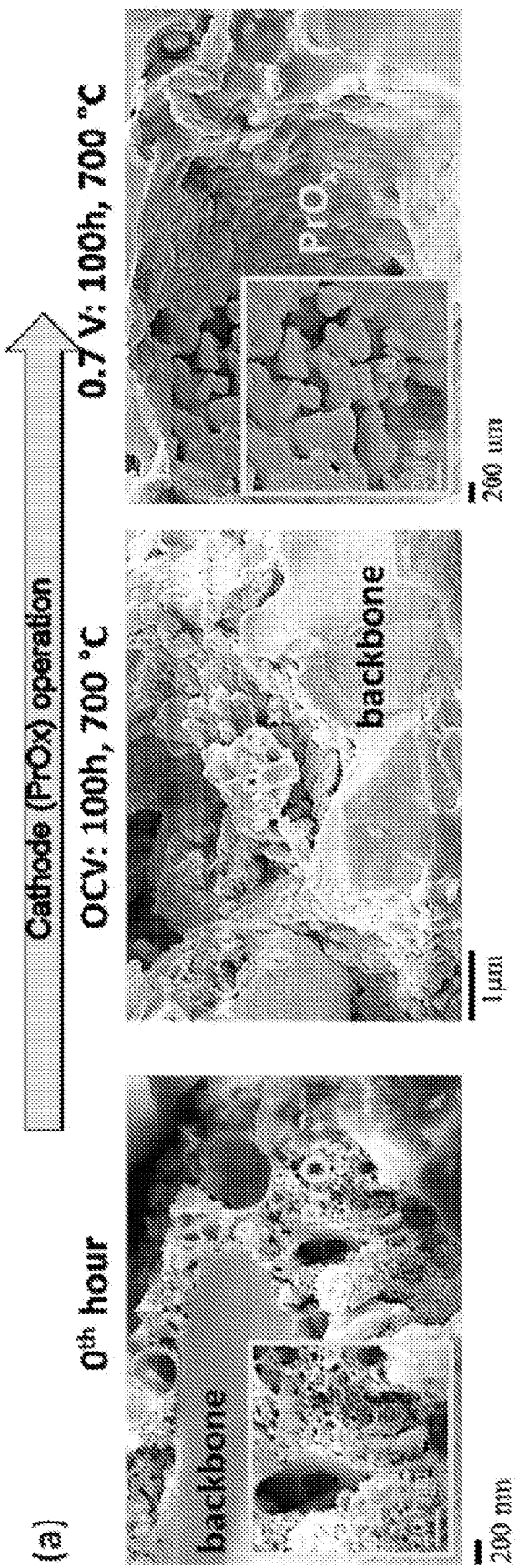
FIGS. 2A-2H show the nanocatalyst structure and phase stability.
Figures 2D, 2E, 2F:
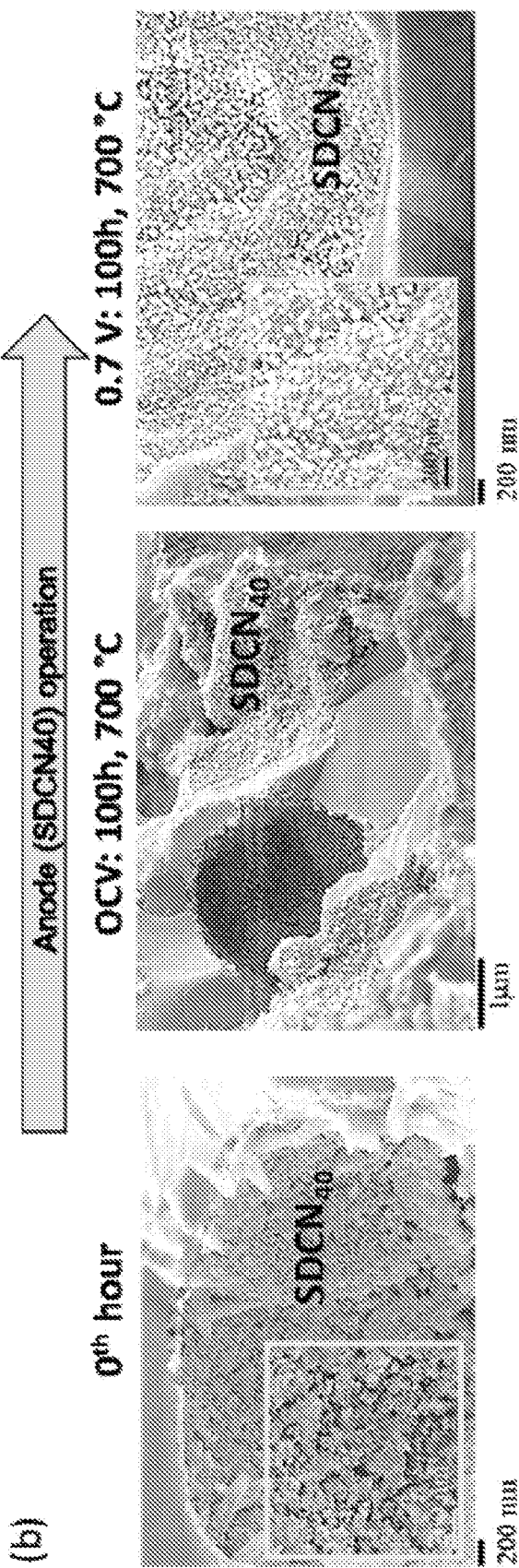

In this work, an attempt was made to separate the impact of thermal coarsening and chromium poisoning in MS-SOFCs. SEM analysis was performed on cathode and anode nanocatalysts in PrO$_x$/YSZ/SDCN$_{40}$ cells at 0th hour (heated to 700° C. and immediately cooled) and after in situ thermal annealing (700° C., 100 h) and electrochemical operation (700° C., 0.7 V, 100 h). A fluffy and porous PrO$_x$ microstructure (at 0th hour) transforms to a dense PrO$_x$ blanket during operation. The catalyst coarsening seems to be predominantly thermally driven, while additional impact of electrochemical operation is not as evident after the initial 100 hours (FIGS. 2A-2C). The microstructure of anode catalyst remains visibly stable during operation (FIGS. 2D-2F). These observations suggest that cathode coarsening is a dominant degradation mode of MS-SOFCs. Due to presence of stainless steel metal supports, MS-SOFCs are also known to undergo Cr poisoning of the cathode catalyst.

Figure 2H:
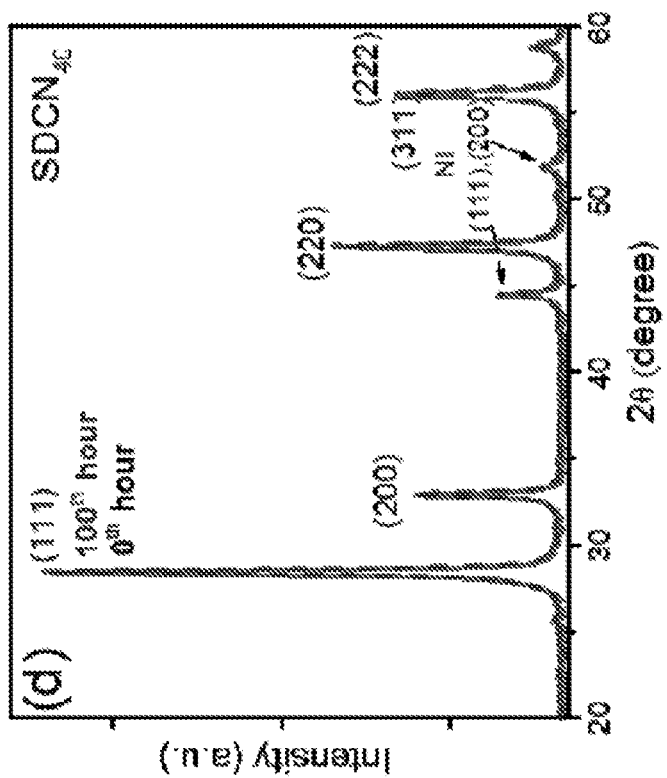
Figure 2G:
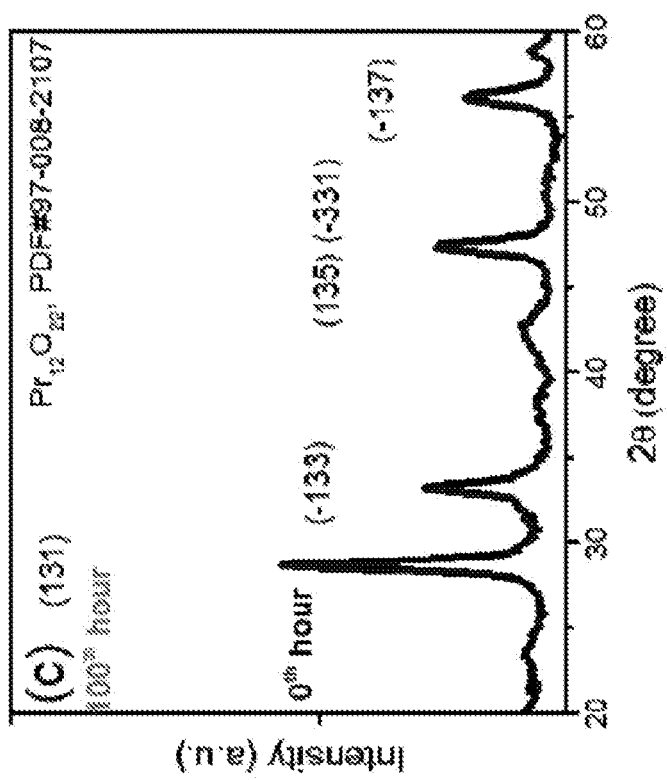

Despite the microstructural evolution, the PrO$_x$ remained in the intended phase. XRD of PrO$_x$ catalyst powder showed stable monoclinic Pr$_6$O$_{11}$ phase after 100 hours of thermal annealing at 700° C. (FIG. 2G). The ratio of peak intensities remained consistent after thermal annealing, indicating homogeneous bulk PrO$_x$. The signature reflections showed decreased peak broadening, consistent with the catalyst coarsening observed with SEM. SDCN$_{40}$ catalyst powder was thermally annealed in 3% humidified hydrogen for 100 hours at 700° C. XRD patterns show mainly SDC phase and the major Ni signature peaks (FIG. 2H). The peak width and peak ratio remained unchanged, indicating retained SDCN$_{40}$ phase and minimal coarsening.

Figure 3:
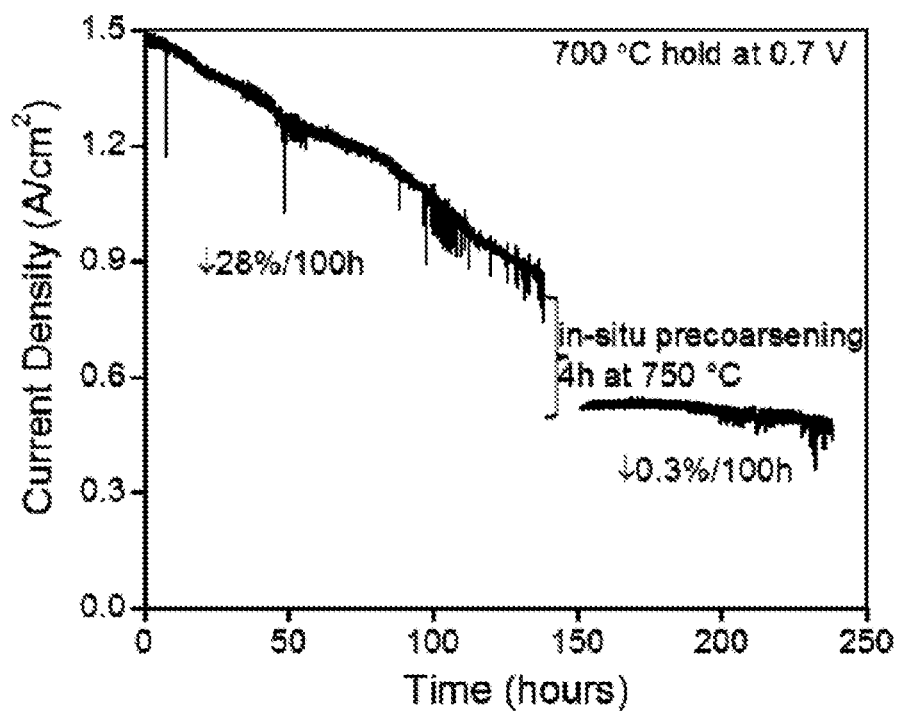
FIG. 3 shows the impact of in situ catalyst pre-coarsening. MS-SOFC durability at 700° C. and 0.7 V before and after in situ catalyst pre-coarsening at 750° C. for 4 h.

Rapid thermal coarsening of PrO$_x$ nanocatalyst in MS-SOFCs presents a major durability challenge. We propose to address this by pre-coarsening the catalyst in situ at elevated temperature, to rapidly achieve the stable, coarsened microstructure expected after prolonged electrochemical operation. To demonstrate, a PrO$_x$/SCSZ/SDCN$_{40}$ cell operated for 140 hours at 700° C. and 0.7 V was then pre-coarsened in situ at OCV for 4 h at 750° C. After pre-coarsening, substantial improvement in degradation to 0.3%/100 h was achieved (FIG. 3). Although the catalyst pre-coarsening leads to 50% decrease in performance, the two order of magnitude improvement in durability is encouraging.

Based on this effect of intentional in situ thermal coarsening, we explored a range of coarsening temperatures to characterize the tradeoff between performance and stability observed above. A wide operating temperature range between 600-750° C. was considered to elucidate the pre-coarsening approach, and cells were pre-coarsened between 25 and 100° C. above the operating temperature at the beginning of life (Table 2). Due to the glass sealing procedure, all cells had to be briefly heated to 700° C., which allowed for initial comparison. Initial peak power for the entire batch of cells used in the matrix varied less than 5% and OCV was 1.12±0.02 V at 700° C. in 3% humidified hydrogen.

TABLE 2

Pre-coarsening vs. operating temperature matrix for PrO$_x$/SCSZ/SDCN$_{40}$ cells.

| Operation temperature (° C.) | In situ pre-coarsening temperature for 4 hours (° C.) | | | | |
|---|---|---|---|---|---|
| | 650 | 700 | 725 | 750 | 800 |
| 750 | | | | | 800 |
| 700 | | | 725 | 750 | 800 |
| 650 | | 700 | | 750 | |
| 600 | 650 | 700 | | | |

Baseline cells (without pre-coarsening) were used for durability comparison and show substantially larger degradation than pre-coarsened cells (FIGS. 4A-4F). Baseline degradation was the lowest at 700° C. and increased in both temperature directions. Higher operating temperature may lead to rapid catalyst coarsening and accelerated Cr poisoning of the cathode catalyst, while the lower operating temperature may lead to increased sensitivity of the performance to catalyst evolution, and breakaway oxidation of the metal support (~600° C.), which will be addressed in more detail below. Durability of selected cells at different temperatures is summarized in FIG. 4B. With in situ pre-coarsening, the degradation is significantly reduced at all operating temperatures. Larger temperature difference between pre-coarsening and operation led to enhanced durability, with the exception of 600° C. operation For instance, a cell operated at 700° C. was pre-coarsened at 725, 750, and 800° C. Pre-coarsening at 725° C. led to 3× lower degradation and the smallest performance tradeoff, 25% drop in power density. A cell pre-coarsened at 750° C. showed s 45% decrease in power density and 3.9%/100 h degradation, which is an order of magnitude improvement over a baseline cell. Pre-coarsening at 800° C. led to 0.3%/100 h degradation at 700° C. and 52% decrease in power density. Similarly, a cell pre-coarsened at 750° C. and operated at 650° C. showed zero degradation during 100 hours and 73% decrease in power density (FIG. 4A).

Despite the expectation that catalyst microstructure evolves more slowly at lower temperature, rapid degradation is observed at 600° C., suggesting a different dominant degradation mechanism (FIGS. 4A and 4B). The corrosion stability of stainless steel greatly depends on the formation of a continuous chromium oxide layer on the surface, which limits the rate of oxidation by acting as a diffusion barrier for oxygen. Although the oxidation rate of metals generally decreases at lower temperatures, several studies of FeCr alloys indicated that the oxidation rate increases dramatically at certain lower temperature intervals where formation of a continuous chromia layer does not occur. This phenomenon is known as breakaway oxidation, and occurs when Cr diffusion to the metal/oxide interface is slower than consumption of chromium by oxidation. Hence, a continuous and protective chromia oxide scale on the surface of the metal is not formed and rapid iron oxidation prevails. With MS-SOFCs, the stainless steel support (P434 alloy) appeared to undergo breakaway oxidation at 600° C., which was evident by the air-side metal support being weakened to the point that it delaminated from the ceramics when removing the cell from the test rig. A full cell operated at 700° C. for 350 hours did not show any Fe oxide (Fe$_2$O$_3$) formation in the metal support, while the cell operated at 600° C. showed severe breakaway oxidation through the entire bulk of the air-side metal support (FIGS. 4C and 4D). Breakaway oxidation is also associated with a rapid OCV drop, which is consistent with performance degradation (FIGS. 4E and 4F). We suspect that the OCV drop arises from cracks in the ceramic layers due to mechanical stress associated with volume expansion of the metal support during breakaway oxidation.

To address the breakaway oxidation, cells were preoxidized in air at 850° C. for 10 hours before catalyst infiltration into the cell. This fabrication step allowed for formation of continuous chromia oxide scale on the metal supports and can potentially suppress the Fe oxidation. Indeed, preoxidation led to improved durability at 600° C. when compared to non-preoxidized cells (FIG. 4F). Although the preoxidation step prolongs the cell operation beyond 100 hours at 600° C., the air-side metal support weakens and OCV eventually undergoes a rapid drop (FIG. 4E). Therefore, operation between 650-700° C. is desirable for MS-SOFCs.

Chromium poisoning is considered as a second major degradation mechanism in MS-SOFCs. Although overshadowed by substantial catalyst coarsening, this degradation mechanism becomes more pronounced during extended electrochemical operation and warrants further study. In the present symmetric architecture, the stainless steel support is a high-surface-area Cr source in close proximity to the cathode active sites. This is expected to be more problematic than the dense stainless steel interconnects used in conventional stacks of ceramic cells.

Figure 5:
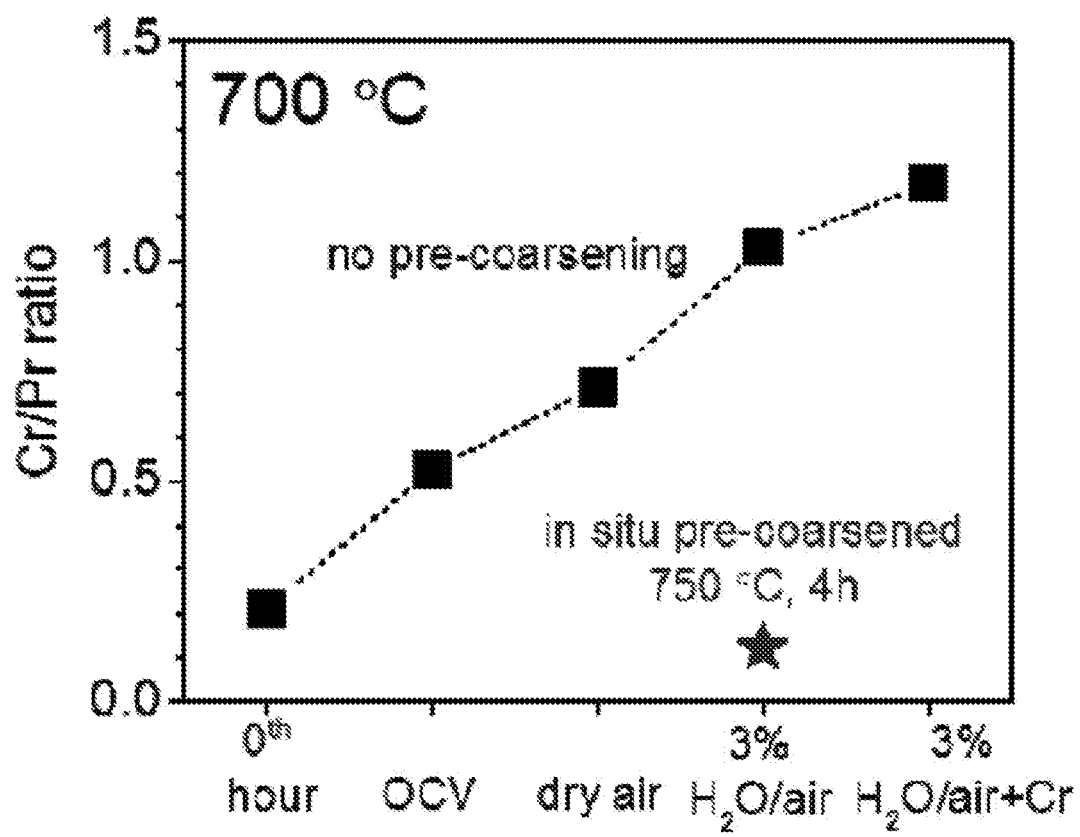
FIG. 5 shows the impact of chromium poisoning. Cr/Pr ratio from EDS spectra near the catalyst/backbone interface for a cell at $0^{th}$ hour, cell held at OCV for 100 hours, and cells operated at 700° C. for 100 hours in different air environments.

Multiple $PrO_x$/SCSZ/$SDCN_{40}$ cells were operated at 700° C. for 100 hours under different air moisture content. Two baseline cells were used for comparison; a cell at 0th hour of operation (heated to 700° C. and immediately cooled), and a cell held at OCV at 700° C. for 100 hours. Performance degradation was accelerated by 22% in dry air and 30% in humidified air after 100 hours at 0.7 V, which further indicates that $PrO_x$ coarsening is a major degradation mechanism in MS-SOFCs but the additional 8% degradation with humidified air can be attributed to promoted Cr poisoning. EDS analysis was conducted on the cells to quantify Cr content in the porous cathode ceramic layer. The selected region of interest was deep within the porous structure of a cell, near the electrolyte/cathode interface. When switching from dry to 3% humidified air, the Cr/Pr ratio increased by 43% (FIG. 5). EDS results revealed saturation of Cr:Pr ratio at 1:1, possibly indicating formation of a stable $PrCrO_4$ phase. To verify, a separate cell with additional infiltration of Cr nitrate on top of $PrO_x$ was also tested. After 100 hours of operation at 0.7 V and 700° C., the Cr/Pr ratio was ~1:1, confirming the formation of $PrCrO_4$ phase (FIG. 5).

The impact of in situ pre-coarsening on Cr poisoning of $PrO_x$ was also investigated. A pre-coarsened cell was operated at 700° C. for 100 hours in 3% humidified air. The post-operation EDS analysis showed suppressed Cr poisoning in the cell (FIG. 5). This could be attributed to substantial catalyst coarsening and reduced catalyst surface area for Cr poisoning, or densification of the catalyst coating on the metal support blocking Cr evaporation. The in-situ pre-coarsening seems to suppress both catalyst coarsening and Cr poisoning degradation mechanisms.

Atomic layer deposition (ALD) is highly advantageous over other deposition techniques in its capability to provide conformal and uniform coatings at true nanoscale, even deep within a porous structure. Such coatings have proved to be effective in suppressing microstructural coarsening and/or Cr migration and boosting electrochemical surface kinetics in SOFCs. Our early efforts for anode-Ce ALD implementation were sparked by an attempt to reduce agglomeration of the fine Ni catalyst particles during long-term electrochemical operation. In the preceding sections of this work, however, it has been shown that anode has minimal impact on MS-SOFC degradation, which is dominated by $PrO_x$ coarsening and Cr poisoning. Therefore, a variety of protective coatings were implemented in this work to further suppress Cr migration.

On the air side, coatings were applied to sintered cell before catalyst infiltration, so as to provide a conformal Cr-blocking coating on the stainless steel. The air-side metal support was coated with $CoO_x$, $Y_2O_3$ or $Al_2O_3$. The fuel-side metal support and electrode were coated with $CeO_2$ after $SDCN_{40}$ infiltration to stabilize the $SDCN_{40}$ microstructure. Coatings were implemented on as-sintered and preoxidized cells for comparison. Cells with 20 nm $CoO_x$ coating and preoxidation provided minimal loss in initial power density, while ~2 nm $Y_2O_3$ or $Al_2O_3$ led to significant loss in power density, which can be attributed to their insulating properties. A 2 nm $CeO_2$ coating led to marginal (3-4%) decrease in power density (FIG. 6A).

Durability of the MS-SOFCs was greatly enhanced by the ALD coatings. To minimize the impact of catalyst coarsening on degradation, all cells were in situ pre-coarsened (750° C., 4h) before durability studies. The cells with ALD-$CoO_x$ coating showed an improved degradation rate during 100 hours of operation at 700° C. and 0.7 V. An order of magnitude improvement in degradation rate (1.5%/100 h) was measured for cells coated directly after sintering, and two orders of magnitude improvement (0.23%/100 h) for cells preoxidized before ALD coating. The thin cathode-side ALD coating was implemented into MS-SOFC before catalyst infiltration and firing. During catalyst firing in air, the chromia scale ($Cr_2O_3$) tended to form on the stainless steel surface, which may crack the thin ALD coating, allowing more Cr migration from the stainless steel support. On the other hand, preoxidized cells already have a thin chromia scale (~1 μm) that does not tend to grow further at a high rate. Therefore, the integrity of the ALD-$CoO_x$ coating is most likely preserved during catalyst infiltration and operation for pre-oxidized cells. Hence, the preoxidized cells show superior durability (FIG. 6B). Other coatings, including $Y_2O_3$ and $Al_2O_3$, also led to improvements in durability; however, due to significant performance tradeoff, the $CoO_x$ protective coating was selected as the major candidate to suppress Cr poisoning in MS-SOFCs with minimal impact on performance. $CeO_2$ coating on the anode did not lead to significant durability improvements, which further points to Cr poisoning on the air side as the second major degradation mechanism in MS-SOFCs (FIG. 6A-6B).

Figures 6A, 6B, 6C:
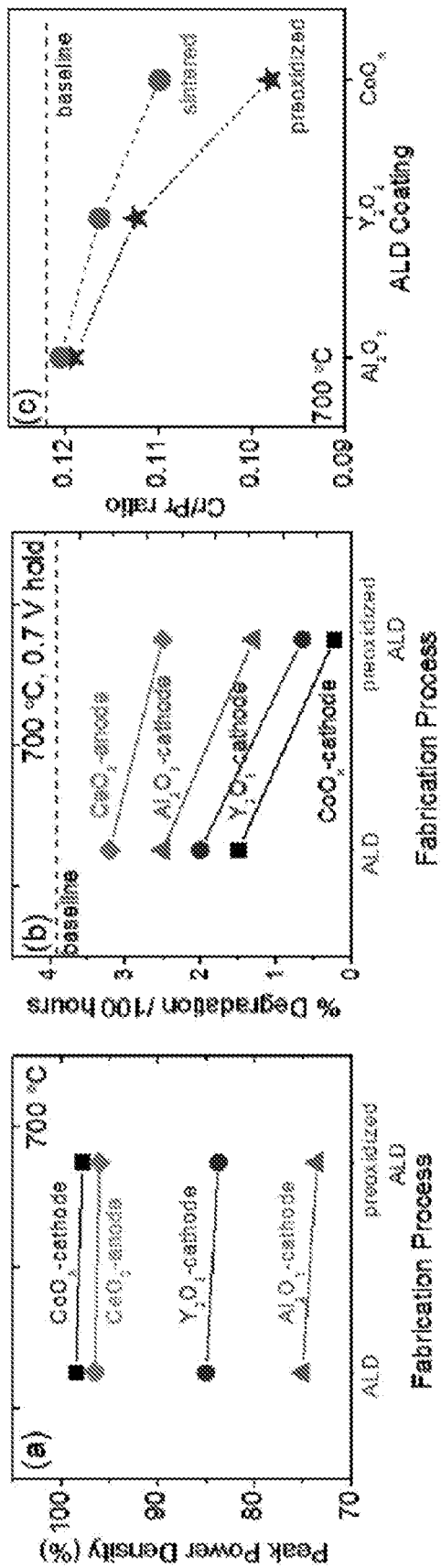
FIGS. 6A-6E show the impact of preoxidation and ALD protective coatings.

Indeed, post-operation EDS analysis on pre-coarsened cells with ALD coatings showed suppressed Cr concentration (FIG. 6C). Preoxidizing before ALD-$CoO_x$ coating provided 25% reduction in Cr concentration; ALD-$CoO_x$ alone provided 10% reduction. Addition of the preoxidation step suppressed Cr poisoning for all three cathode coatings.

Figure 6E:
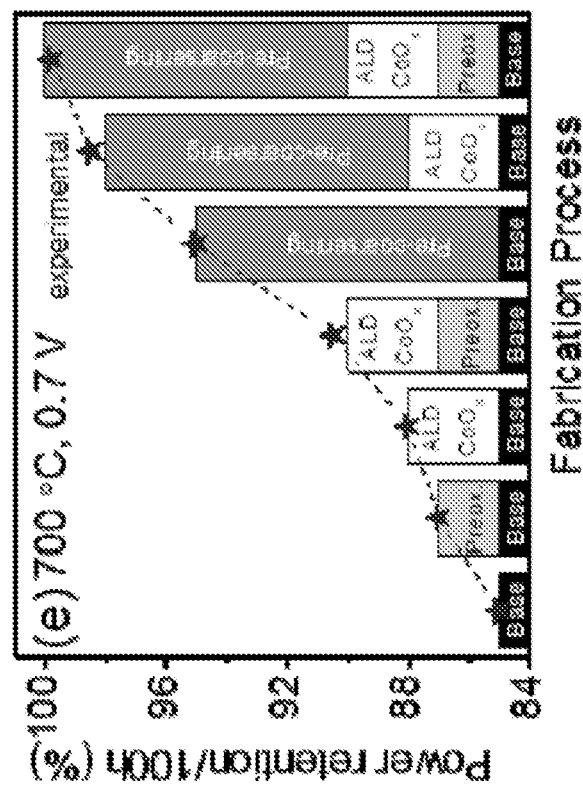
Figure 6D:
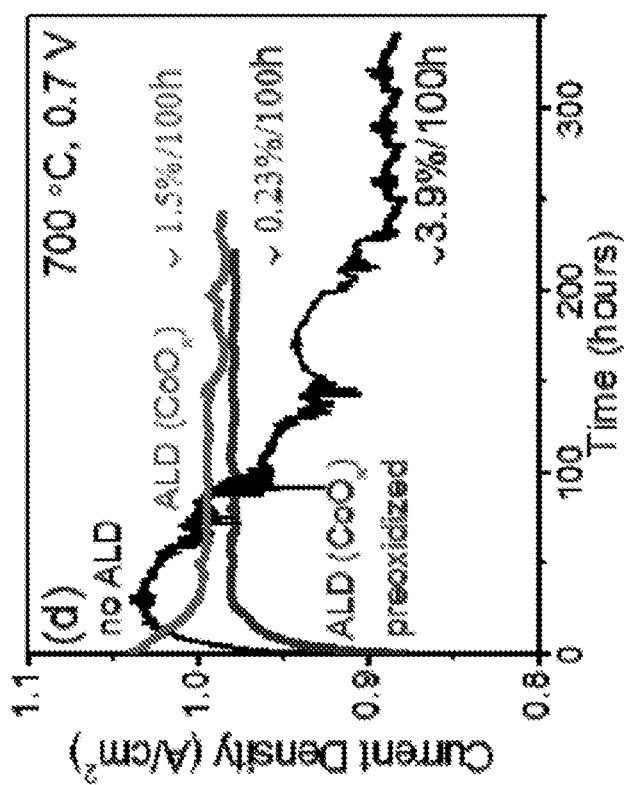

Long-term electrochemical operation (220-350 hours) was conducted on MS-SOFCs with and without ALD-$CoO_x$ coating. Degradation of 2.3% $kh^{-1}$ was measured for a preoxidized and ALD-$CoO_x$ coated cell, compatible with the ~10,000 hours desired lifetime of MS-SOFCs for vehicular applications (FIG. 6D). The major three MS-SOFC post-sintering fabrication processes found here to be crucial in stabilizing the performance of MS-SOFCs, in the respective order, include: (1) preoxidation of the metal support which leads to formation of protective and conductive chromia scale, (2) ALD coating of CoO which suppresses Cr migration from the metal support, and (3) in situ catalyst pre-coarsening which significantly enhances electrochemical durability by accelerating particle coarsening and reducing the active surface area for chromium poisoning.

To further isolate the impact of each post-sintering fabrication process on MS-SOFC durability, a series of cells with single or multiple post-sintering processing steps were prepared. A set of two cells were tested for each fabrication condition. A baseline set contained catalyst that was not pre-coarsened and had no additional processing before operation. A second set contained preoxidized metal support as an additional process. A third set contained ALD-$CoO_x$ coating as an additional process. A fourth set contained in situ pre-coarsened catalyst as an additional process. Finally, a combination of two or more processes was implemented in a single cell. Systematic analysis suggests that fabrication processes are additive towards durability improvements of MS-SOFCs, corresponding to approximate agreement between stacked bars for each individual process and overlaid experimental results (FIG. 6E). The impact of pre-coarsening on power retention was dominant, followed by the ALD-$CoO_x$ and preoxidation, respectively.

Figure 7A:
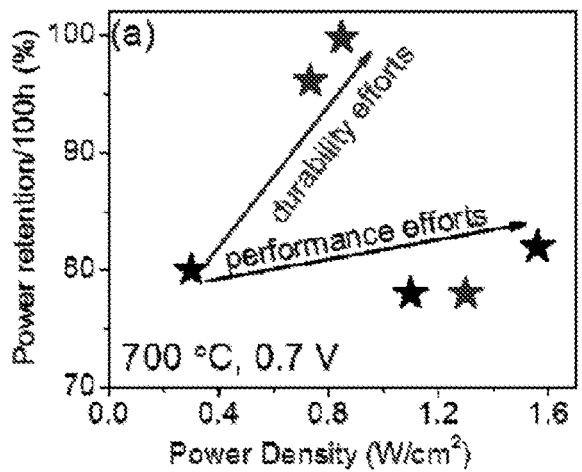
FIGS. 7A-7F show durability progress.
Figure 7B:
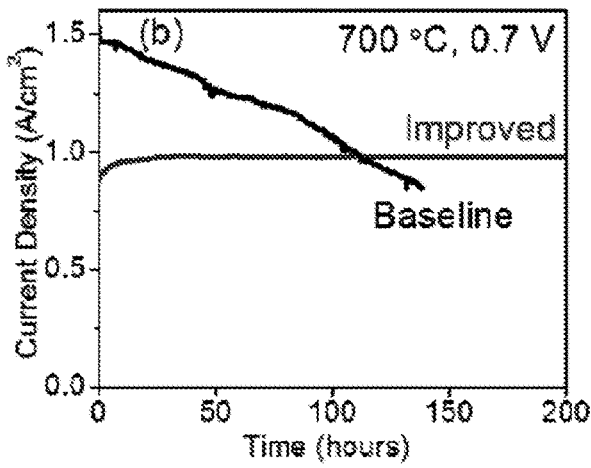

Our preceding performance efforts showed substantial improvements in MS-SOFC peak power density (performance was doubled) by introducing new catalyst compositions, more conductive ceramics, and thinner electrolyte. In this work, we focused on durability aspect of MS-SOFCs. Aggregating the improvements identified above, including preoxidation of the metal support, protective ALD-$CoO_x$ coating, and in situ catalyst pre-coarsening, resulted in two orders of magnitude improvement in power retention of MS-SOFCs (FIG. 7A). Performance degradation of 2.3% $khr^{-1}$ was achieved at 700° C. and 0.7 V (FIG. 7B).

Figure 7C:
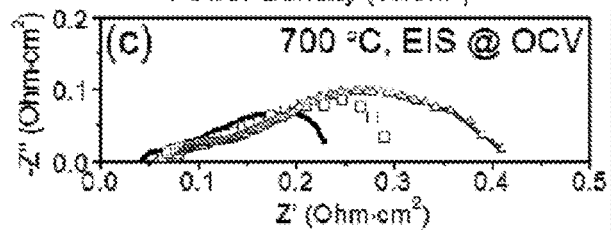
Figure 7D:
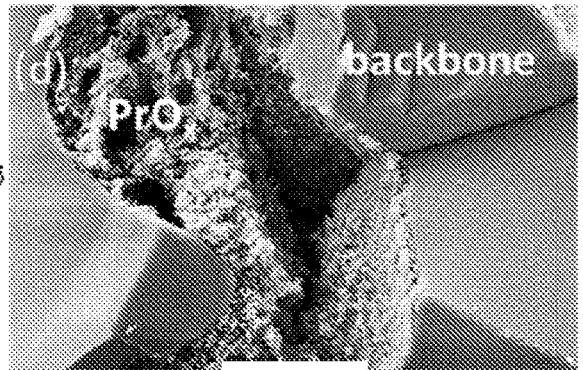
Figure 7E:
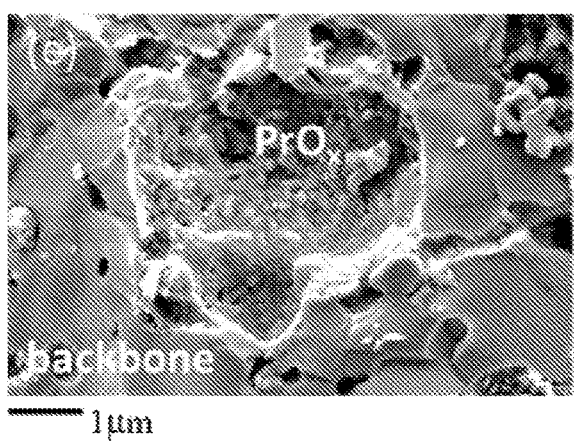
Figure 7F:
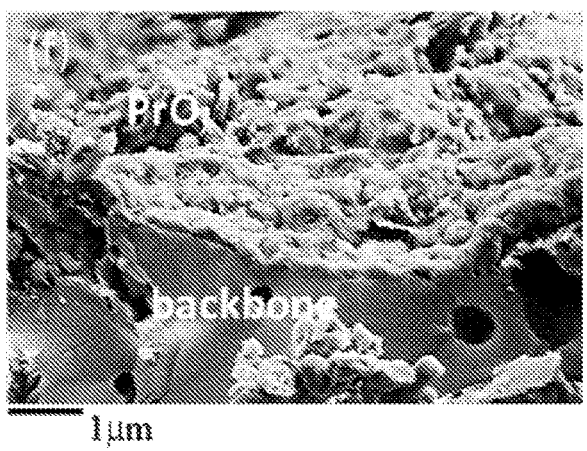

The respective EIS curves at 0th hour and at the last hour of electrochemical operation showed an increase in $R_{ohm}$ and $R_{pol}$ for a baseline non-pre-coarsened cell, while a cell with all three processing improvements showed relatively stable EIS (FIG. 7C). The increase in $R_{ohm}$ and $R_{pol}$ during operation was dominated by the cathode catalyst pre-coarsening (similar occurs with in situ pre-coarsening), as shown by the cross-sectional SEM images of baseline and in situ pre-coarsened cells. $PrO_x$ coarsening was evident in the baseline cell during electrochemical operation (FIG. 2A), while the in situ pre-coarsened catalyst did not seem to coarsen further even after 200 hours of electrochemical operation (FIGS. 7D-7F).

Preoxidation of the metal support and application of a thin ALD-$CoO_x$ coating did not seem to inhibit conduction or catalytic properties of the cell, as shown by unaffected peak power density (FIG. 6A). While enhancing the MS-SOFC durability, a significant performance tradeoff was made. A 35% loss in initial power density was measured; however, two orders of magnitude improvement in degradation rate is encouraging (FIGS. 7A and 7B). Since durability studies in this work were conducted on cells with thick SCSZ electrolyte (12 μm), an additional ~20% increase in overall power density could be expected with thin SCSZ electrolyte (7 μm), based on the previous performance efforts.

Motivated by the requirements for use in vehicle range extenders, symmetric-architecture MS-SOFCs have been configured for high performance and longevity. Previously, we have demonstrated high power density (1.56 W $cm^{-2}$ at 700° C.) for stainless steel MS-SOFCs using $Pr_6O_{11}$ cathode, $SDCN_{40}$ anode, and specified cell configuration. In this work, we have explored the tradeoff between performance and durability and identified the major degradation mechanisms: cathode catalyst coarsening and Cr poisoning. The impact of anode on MS-SOFC degradation was found to be minimal in comparison to the cathode contribution.

Preoxidation of the metal support was found to be beneficial for the longevity of MS-SOFCs, leading to formation of conductive chromia scale. To prevent Cr migration from the metal support and chromia scale to the catalyst sites, a thin $CoO_x$ ALD coating (20 nm) was implemented on air-side metal support after preoxidation. Both fabrication steps only marginally impacted the cell ASR. The catalyst coarsening was accelerated via an in situ pre-coarsening step at the beginning of cell life (OCV, 750° C., 4 hours), which stabilized the catalyst microstructure during long-term electrochemical operation. The EIS and SEM results confirmed that cathode coarsening dominates the cell ASR during prolonged operation. With combination of these fabrication steps, the degradation rate of MS-SOFCs has been improved by two orders of magnitude at 0.7 V and 700° C., to 2.3%/kh, which is within the target range for vehicular applications. A 35% loss in initial power density was measured after MS-SOFC preoxidation, ALD coating, and pre-coarsening, which is a reasonable tradeoff considering the dramatic durability improvement.

Example 2

Cells were prepared with the process described above in the first paragraph of Example 1. Electrophoretic deposition (EPD) was used to coat the external and internal surfaces of the metal support with sub-micron powder of (Cu,Mn)-oxide. In one cell, metal supports on both sides were coated. In another cell, only the oxygen-electrode side was coated. Metal supports are amenable to EPD coating because they are electrically conductive. EPD coats the surface of a conductive surface, so in MS-SOFCs the metal support is substantially coated, and the ceramic layers (electrodes and electrolyte) remain substantially uncoated. EPD was performed by placing the MS-SOFC in a beaker of solution containing ethanol, iodine, and (Cu,Mn)-oxide particles, and using a power supply to maintain it at around −20 volts relative to a copper plate also held in the solution for about 10 minutes. After deposition of the (Cu,Mn)-oxide particles, the MS-SOFC was dried in air and then heated to 1000° C. for 4 hours in reducing atmosphere (2% hydrogen in argon), followed by heating in air to 750° C. for 5 hours. After this process, a continuous, high-density (Cu,Mn)-oxide coating of 1 micrometer to 10 micrometers thick was observed throughout the metal support.

Example 3

Description of metal-supported solid oxide electrolysis cell (MS-SOEC) fabrication: Metal-supported cells described in this Example 3 were prepared by a co-sintering fabrication process. SCSZ and stainless steel (P434L alloy, water atomized) layers were prepared by tape casting, using polymethyl methacrylate pore-former beads and water-based tape-casting binder. After tape casting, these layers were then laminated into a green cell assembly with the symmetric cell architecture. Individual cells were cut into circular shapes (e.g., with diameter of 30 mm) from a large green sheet with a laser cutter. These circular cells were fired in air in a muffle furnace at 525° C. for 1 hour to remove the binder and pore former. Cells were then sintered at 1350° C. for 2 hours in a tube furnace with 2% $H_2$—Ar flowing inside, in order to obtain a dense SCSZ electrolyte and also mechanically rugged porous metal supports with high electronic conductivity.

After co-sintering of the metal and ceramic layers, electrode catalysts were introduced into the porous SCSZ backbones on both oxygen and hydrogen electrode sides by infiltrating precursor solutions of nitrate salts. Six types of oxygen evolution catalysts were fabricated and studied: single catalysts including $La_{0.15}Sr_{0.85}MnO_{3-\delta}$ (LSM), $La_{0.6}Sr_{0.4}Co_{0.2}Fe_{0.8}O_{3-\delta}$ (LSCF), $Pr_6O_{11}$, and composite catalysts with $Sm_{0.2}Ce_{0.8}O_{2-\delta}$ (SDC) including LSM-SDC, LSCF-SDC, and $Pr_6O_{11}$-SDC (with catalyst-SDC ratios determined by the number of individual infiltration steps, as discussed below). On the steam side of the cells, $Sm_{0.2}Ce_{0.8}O_{2-\delta}$ (SDC) mixed with Ni (SDCN) was used as hydrogen electrode catalyst. The ceria:Ni volume ratio was varied as 80:20, 60:40, or 40:60 (corresponding electrodes are denoted as SDCN20, SDCN40, and SDCN60).

Precursors solutions for infiltration were prepared by dissolving metal nitrates with intended stoichiometric ratio into a mixture of surfactant and distilled water (surfactant-water mixture was prepared by stirring for 1 hour at room temperature). Surfactant loading was 0.3 grams per 2 grams of resulting catalyst particles, and final water/solution ratio was 15-40 wt. %, intended to improve wettability of precursor solution into pores of ceramic backbone. Before infiltration, the precursor mixture was stirred and heated at 50-60° C. on a hot plate for 30 minutes to completely dissolve the metal nitrate. Infiltration of precursor solutions was then performed by submerging the cells into the precursor solutions at approximately 90° C., with mild vacuum (~500 mbar) applied to evacuate the air in the cell pores. To avoid infiltration of precursor solutions into unintended area, the cells were masked with acrylic paint with only the desired active area exposed. The active area of a cell was 1 cm$^2$.

After infiltrating the precursor, the cells were then fired at 850 or 600° C. for 30 minutes in air in a muffle furnace to convert the metal nitrates into the desired oxide phases. Any loose catalyst on the surface of the cells after firing was removed by light brushing. Cells were re-infiltrated for a number of times, until the desired catalyst loading was achieved. The volume of catalyst introduced by each infiltration cycle can be estimated from the concentration of precursor solution and catalyst density, assuming the pores are completely flooded with precursor solution. Thus, catalyst loading per infiltration cycle can be represented by the filling factor, which is volume fraction of catalyst in the pores. The filling factors per infiltration cycle for LSM, LSCF and $Pr_6O_{11}$ are all in the range of 5-7%, and those for Ni and SDC are approximately 3% and 10%, respectively. Deposited weight of the nitrate precursor is typically 23 and 40 mg cm$^{-2}$ per infiltration cycle, for the air catalyst and fuel catalyst, respectively. Some details of infiltration cycles can be described as follows:

Hydrogen electrode catalyst—for different ceria:Ni ratio, the number of infiltrations was varied until a final Ni filling factor of 8% was obtained. Based on previous SOFC work, performance of cells plateaued around this Ni loading and further infiltration cycles would not increase the cell performance significantly.

Single oxygen electrode catalyst: Single oxygen electrode catalysts (LSM, LSCF, or $Pr_6O_{11}$) were infiltrated for three times, as it was found in a previous study that performance of cells with three infiltration cycles of LSM in oxygen electrode was optimal for SOFC operation. The corresponding catalyst filling factor was approximately 11%.

Composite oxygen electrode catalyst: Two infiltration strategies were used for the composite catalyst: (a) infiltration of a solution which is mixture of precursor nitrates for both the electronic conductor (LSM, LSCF, or $Pr_6O_{11}$) and the ionic conductor (SDC), and (b) introduction of the electronic and ionic conductors separately in different infiltration cycles.

Crystallisation temperature of infiltration cycles: The crystallisation temperature of each infiltration cycle was either 850 or 600° C. The first infiltrated layer of any catalysts (LSM/LSCF/$Pr_6O_{11}$/SDC/SDCN) was fired at 850° C. to improve the percolation of particles, which can result in improved electronic conductivity of the electrode. The subsequent infiltrated catalyst layers were fired at 600° C. in order to provide high surface area of electrodes.

An oxygen electrode with doped ceria composite improves performance. Although LSCF and $Pr_6O_{11}$ are considered to have mixed ionic and electronic conductivities, the electronic contribution dominates. Incorporation of an ionic conductor (such as doped ceria) into the oxygen electrode is a common approach to increase the triple-phase boundary length available for the oxygen reduction reaction (ORR) in SOFC cathodes or oxygen evolution reaction (OER) in SOEC anodes. Here, Samarium doped ceria (SDC) was added to the oxygen electrode via infiltration as a second separate layer, i.e. an "ABAA" layered arrangement was obtained, where "A" stands for electronic conductor LSM, LSCF, or $Pr_6O_{11}$, and "B" stands for ionic conductor SDC (such denotations will be used in this Example 3 for ease of expressing the infiltration steps).

Addition of SDC to form a composite catalyst significantly improved performance for all oxygen catalysts studied. At 1.3 V, cells with LSM-SDC, LSCF-SDC and $Pr_6O_{11}$-SDC composite electrode provided current densities of −0.94, −1.16, and −1.93 A cm$^{-2}$, respectively, resulting in 18%, 26% and 71% improvement compared to the corresponding single catalyst electrodes. It appeared that SDC provided higher improvement for materials with higher catalytic activity. EIS reveals improvement primarily to the polarization resistance upon addition of SDC. The ohmic resistance ($R_\Omega$) of LSM-SDC, LSCF-SDC, and $Pr_6O_{11}$-SDC cells was 0.101, 0.112, and 0.088 Ω·cm$^2$, respectively, and the polarization resistance ($R_p$) was 0.19, 0.17, and 0.09 Ω·cm$^2$, respectively. Interestingly, for LSCF and $Pr_6O_{11}$ catalysts, addition of SDC also decreased the ohmic resistance. The decrease of both $R_p$ and $R_\Omega$ suggests that incorporating SDC into oxygen electrode enhances the three phase boundaries (TPB's) for oxygen evolution reaction, and also improves ionic conduction in the infiltrated layers.

Enhanced OER catalysis can be achieved with an alternating-infiltrated composite electrode. As described in the above-paragraphs of Example 3, by incorporating SDC in the oxygen electrode, the cell performance can be significantly improved. To determine which electrode dominates the cell polarization, the electrodes were separated by fabricating symmetric cells with LSCF-SDC, $Pr_6O_{11}$-SDC, or SDCN20 infiltrated in both electrodes and measuring their impedance spectra in the relevant atmospheres at OCV. It was found that the polarization resistance of the oxygen electrode (LSCF-SDC or $Pr_6O_{11}$-SDC) was significantly higher than that of hydrogen electrode (SDCN20), which implies $R_p$ from oxygen electrode dominates total cell resistance.

Figure 10:
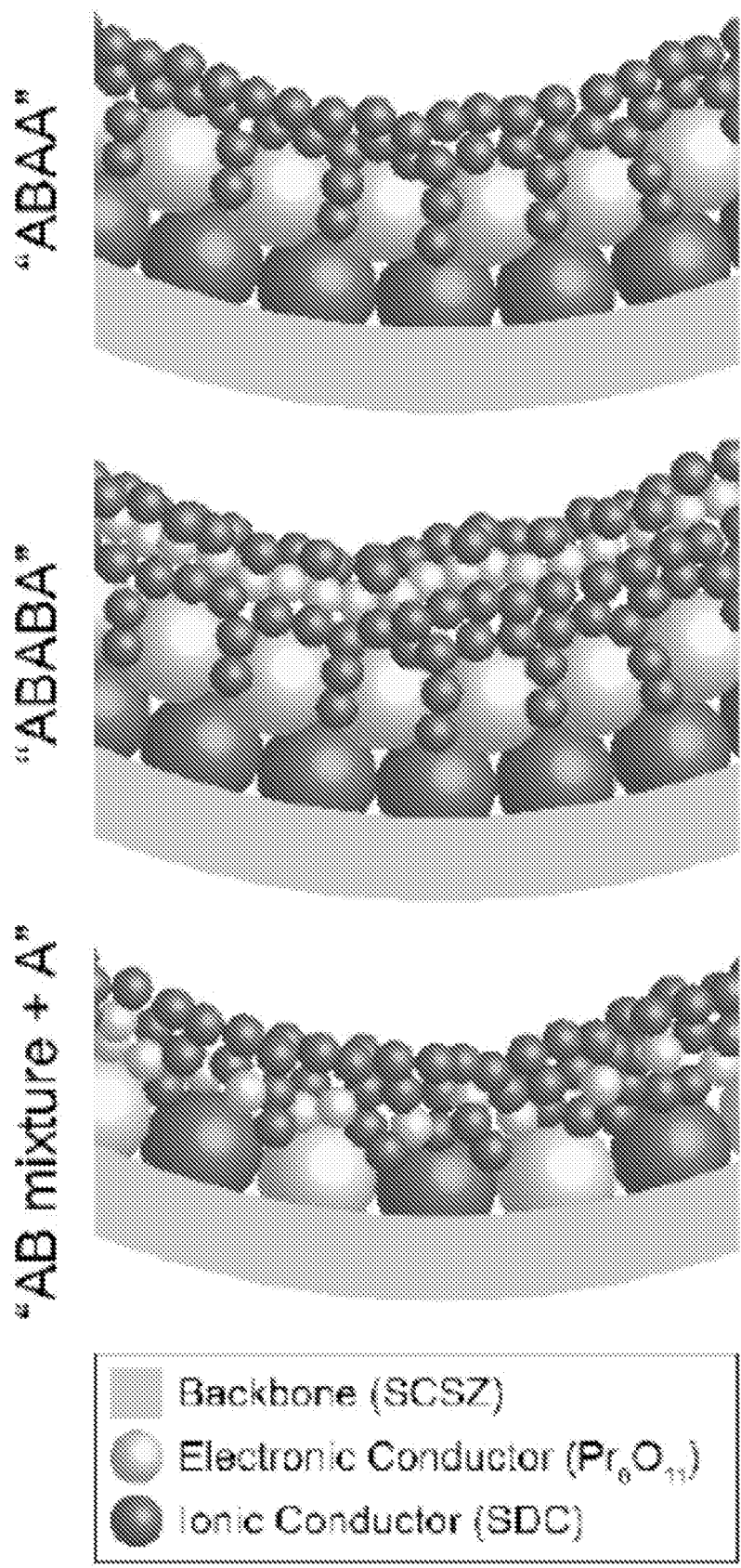
FIG. 10 shows an example of a schematic illustration of a of composite oxygen electrode catalyst in a pore within the SCSZ backbone, with "ABAA", "ABABA", and "ABmix+A" sequences (A=$Pr_6O_{11}$, B=SDC). Larger and smaller particle size represents the catalysts fired at 850° C. and 600° C., respectively, and do not necessarily correlate to their actual size ratio.

With the intention to enhance OER activity of the oxygen electrode, various infiltration strategies for fabricating the composite oxygen electrode were implemented. Here, $Pr_6O_{11}$-SDC composite catalyst was used for this study as it provided the highest cell performance. Three sequences of composite electrode infiltrations were compared, namely "ABAA", "ABABA", and "AB mixture+A", where "A" represents the electronic conductor ($Pr_6O_{11}$ in this case), and "B" represents the ionic conductor (SDC in this case). The expected schematics of catalyst arrangements in the porous backbone are shown in FIG. 10, and their infiltration processes are described in detail as follows:

ABAA (as baseline): The first layers of $Pr_6O_{11}$ and SDC are infiltrated separately and each fired at 850° C. so that a good electronic pathway from $Pr_6O_{11}$ and good extension of ionic conduction from SDC can be obtained. On top of the first two layers, two more layers of $Pr_6O_{11}$ are infiltrated and fired at 600° C. to provide a higher surface area for oxygen evolution.

ABABA: Compared with ABAA, this alternating-layer composite arrangement includes an additional layer of SDC between the last two layers of $Pr_6O_{11}$, fired at 600° C. The additional SDC layer is intended to extend the ionic conduction network and to create more TPB throughout the thickness of the catalyst layers.

AB mixture+A: In contrast to the other two sequential arrangements, nitrate salts precursors for $Pr_6O_{11}$ and SDC were mixed in a single solution yielding a final volume ratio of $Pr_6O_{11}$:SDC=1:1. This mixed-nitrate solution was infiltrated into the porous backbone twice (fired at 850 and 600° C., respectively), followed by one additional $Pr_6O_{11}$. The $Pr_6O_{11}$ and SDC mixture is intended to create intimate mixing of electronic and ionic conduction pathways, providing a true "composite" electrode. XRD of the mixed $Pr_6O_{11}$-SDC confirmed that secondary non-fluorite phases were not formed.

The sequence of composite catalyst deposition significantly impacts electrolysis performance. At 1.3 V, "ABABA", "ABAA", and "AB mixture+A" cells provided −1.91, −1.50, and −1.19 A $cm^{-2}$ current densities, respectively. EIS indicates this trend is related to improvements in both the ohmic and polarization resistances. Comparison of Bode plots of the three cells clearly shows that the major advancement provided by the ABABA configuration was due to the decrease of impedance at higher frequencies from ~$10^2$ to $10^4$ Hz, whereas the impedances at lower frequencies (less than 10 Hz) were about the same.

CONCLUSION

Further description of the embodiments described herein can be found in the publication R. Wang et al., "Metal-Supported Solid Oxide Electrolysis Cell with Significantly Enhanced Catalysis," Energy Technol. 2019, 7, 1801154, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
   (a) oxidizing a stainless steel support of a device, the device being a metal-supported solid oxide electrochemical device;
   (b) depositing a coating on an oxygen-electrode side of the stainless steel support of the device, the coating operable to reduce chromium evaporation from the stainless steel support;
   (c) forming a structure including an oxygen catalyst on the oxygen-electrode side of the device and a fuel catalyst on a fuel-electrode side of the stainless steel support of the device, with an electrolyte disposed between the oxygen catalyst and the fuel catalyst; and
   (d) thermally treating the device at a temperature of about 10° C. to 400° C. above an operating temperature of about 600° C. to 800° C. of the device, the oxygen-electrode side of the device being in an oxidizing atmosphere and the fuel-electrode side of the device being in a reducing atmosphere.

2. The method of claim 1, wherein the stainless steel support is oxidized at about 700° C. to 1000° C. for about 0.1 hours to 14 hours in air or a mixture of gases comprising steam and hydrogen.

3. The method of claim 1, wherein operation (a) produces a layer of chromium oxide on the stainless steel support.

4. The method of claim 1, wherein the coating is deposited on the oxygen-electrode side of the stainless steel support using a method selected from a group including atomic layer deposition, electrophoretic deposition, and infiltrating the coating on the stainless steel support.

5. The method of claim 1, wherein the coating is a conformal coating.

6. The method of claim 1, wherein the coating is selected from a group consisting of cobalt, manganese, copper, aluminum, yttrium, cerium, lanthanum, nickel, iron, chromium, alloys of the foregoing elements, and oxides of the foregoing elements and alloys.

7. The method of claim 1, wherein operation (d) sinters and/or coarsens the oxygen catalyst and the fuel catalyst.

8. The method of claim 1, wherein the thermal treatment is for about 0.5 hours to 10 hours.

9. The method of claim 1, wherein operation (d) grows a grain size or particle size of the oxygen catalyst and a grain size or particle size of the fuel catalyst to about 50 nanometers to 1 micron.

10. The method of claim 1, wherein the temperature in operation (d) is about 25° C. to 100° C. above the operating temperature of the device.

11. The method of claim 1, further comprising:
   after operation (d), depositing the oxygen catalyst on the oxygen-electrode side of the device or depositing the fuel catalyst on a fuel-electrode side of the device.

12. The method of claim 1, wherein the oxygen catalyst comprises Pr-oxide (PrOx) or a composite of Pr-oxide (PrOx) and samarium doped ceria (SDC).

13. The method of claim 1, wherein the oxygen catalyst includes a composite of lanthanum strontium cobalt ferrite (LSCF) and samarium doped ceria (SDC).

14. The method of claim 1, wherein the device is selected from a group consisting of a metal supported solid oxide fuel cell (MS-SOFC), a metal supported solid oxide electrolysis cell, a metal supported solid oxide electrochemical reactor, a metal supported solid oxide oxygen generator, a metal supported solid oxide electrochemical hydrogen generator, and a metal supported solid oxide electrochemical hydrogen compressor.

15. The method of claim 1, wherein the coating is deposited on the oxygen-electrode side of the stainless steel support using atomic layer deposition or electrophoretic deposition, and wherein the coating comprises $CoO_x$.

16. A method comprising:
   (a) depositing a coating on an oxygen-electrode side of a stainless steel support of a device, the coating operable to reduce chromium evaporation from the stainless steel support, the device being a metal-supported solid oxide electrochemical device;

(b) forming a structure including an oxygen catalyst on the oxygen-electrode side of the device and a fuel catalyst on a fuel-electrode side of the stainless steel support of the device, with an electrolyte disposed between the oxygen catalyst and the fuel catalyst; and (c) thermally treating the device at a temperature of about 10° C. to 400° C. above an operating temperature of about 600° C. to 800° C. of the device, the oxygen-electrode side of the device being in an oxidizing atmosphere and the fuel-electrode side of the device being in a reducing atmosphere.

17. The method of claim 16, wherein operation (c) sinters and/or coarsens the oxygen catalyst and the fuel catalyst.

18. The method of claim 16, wherein operation (c) grows a grain size or particle size of the oxygen catalyst and a grain size or particle size of the fuel catalyst to about 50 nanometers to 1 micron.

19. A method comprising:
(a) forming a structure including an oxygen catalyst on an oxygen-electrode side of a stainless steel support of a device, and a fuel catalyst on a fuel-electrode side of the stainless steel support of the device, with an electrolyte disposed between the oxygen catalyst and the fuel catalyst, the device being a metal-supported solid oxide electrochemical device; and (b) thermally treating the device at a temperature of about 10° C. to 400° C. above an operating temperature of about 600° C. to 800° C. of the device for about 0.5 hours to 10 hours, the oxygen-electrode side of the device being in an oxidizing atmosphere and the fuel electrode side of the device being in a reducing atmosphere, the thermal treatment sintering and/or coarsening a microstructure of the oxygen catalyst and a microstructure of the fuel catalyst.

20. The method of claim 19, wherein operation (b) grows a grain size or particle size of the oxygen catalyst and a grain size or particle size of the fuel catalyst to about 50 nanometers to 1 micron.

* * * * *